(12) United States Patent
Saroiu et al.

(10) Patent No.: US 12,067,111 B2
(45) Date of Patent: Aug. 20, 2024

(54) LIVENESS GUARANTEES IN SECURE ENCLAVES USING HEALTH TICKETS

(71) Applicant: Microsoft Technology Licensing, LLC, Redmond, WA (US)

(72) Inventors: Stefan Saroiu, Redmond, WA (US); Varun Gandhi, Boston, MA (US); Alastair Wolman, Seattle, WA (US); Landon Prentice Cox, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 302 days.

(21) Appl. No.: 17/545,716

(22) Filed: Dec. 8, 2021

(65) Prior Publication Data

US 2023/0177148 A1 Jun. 8, 2023

(51) Int. Cl.
*G06F 21/54* (2013.01)
*G06F 11/07* (2006.01)
*G06F 21/55* (2013.01)
*G06F 21/57* (2013.01)
(Continued)

(52) U.S. Cl.
CPC .......... *G06F 21/54* (2013.01); *G06F 11/0757* (2013.01); *G06F 21/554* (2013.01); *G06F 21/572* (2013.01); *G06F 21/602* (2013.01); *G06F 21/107* (2023.08)

(58) Field of Classification Search
CPC .... G06F 11/0757; G06F 21/54; G06F 21/554; G06F 21/572; G06F 21/602; G06F 21/107
See application file for complete search history.

(56) References Cited

U.S. PATENT DOCUMENTS

| 10,452,384 B2 | 10/2019 | England |
| 10,528,721 B2 | 1/2020 | Sood et al. |
| 10,956,564 B2 | 3/2021 | Dhoble et al. |

(Continued)

OTHER PUBLICATIONS

"International Search Report and Written Opinion Issued in PCT Application No. PCT/US22/044308", Mailed Date: Nov. 17, 2022, 13 Pages.

(Continued)

*Primary Examiner* — Paul E Callahan
(74) *Attorney, Agent, or Firm* — Mark K. Young; Mark Young PC

(57) ABSTRACT

A health ticket minting process operates in a secure enclave on a computing device to ensure liveness of the enclave should a maliciously-compromised operating system deny service to starve the enclave. Cryptographically-secured health tickets provided by the minting process reset an authenticated watchdog timer (AWDT) that reboots the device from a hardware-protected recovery operating system if the timer expires. The health tickets are written to a secure channel using a symmetric key that is provisioned by repurposing an existing Intel SGX (Software Guard Extension) Versioning Support protocol that enables migration of secrets between enclaves that have the same author. In the event that the enclave fails to make forward progress and health tickets are not minted, then the AWDT expires and forces the reboot and re-imaging to a known good state to evict the malware from the computing device.

20 Claims, 19 Drawing Sheets

(51) Int. Cl.
*G06F 21/60* (2013.01)
*G06F 21/10* (2013.01)

(56) References Cited

U.S. PATENT DOCUMENTS

| | | | |
|---|---|---|---|
| 2009/0119748 A1* | 5/2009 | Yao | G06F 21/57 726/2 |
| 2012/0159184 A1 | 6/2012 | Johnson et al. | |
| 2019/0243630 A1 | 8/2019 | England | |
| 2020/0313893 A1 | 10/2020 | Thom et al. | |
| 2021/0157563 A1 | 5/2021 | Duval | |
| 2021/0256132 A1* | 8/2021 | Lewis | G06F 21/554 |

OTHER PUBLICATIONS

Xu, et al., "Dominance As A New Trusted Computing Primitive For The Internet Of Things", In Proceedings of IEEE Symposium on Security and Privacy, May 19, 2019, pp. 1415-1430.

Kaaniche, et al., "Prov-Trust: Towards a Trustworthy SGX-based Data Provenance System", In Proceedings of the 17th International Joint Conference on e-Business and Telecommunications, Jul. 10, 2020, 13 Pages.

Lee, et al., "Keystone: An Open Framework for Architecting TEEs", In Repository of arXiv:1907.10119v2, Sep. 7, 2019, 18 Pages.

Priebe, et al., "EnclaveDB: A Secure Database using SGX", In the Proceedings of the IEEE Symposium on Security & Privacy, May 2018, 15 Pages.

* cited by examiner

LIVENESS GUARANTEES IN SECURE ENCLAVES USING HEALTH TICKETS

BACKGROUND

Trusted Execution Environments (TEEs) are seeing increased use in many security-critical applications. A TEE is an environment that enforces execution of only authorized code. Any data in the TEE cannot be read or tampered with by any code outside that environment. An exemplary TEE is SGX (Software Guard Extension) that provides an enclave technology on Intel processors. SGX enclaves provide an isolated environment with an untrusted operating system to provide runtime protection for the execution of security-critical code and data.

SUMMARY

A health ticket minting process operates in a secure enclave on a computing device to ensure liveness of the enclave should a maliciously-compromised operating system deny service to starve the enclave. Cryptographically-secured health tickets provided by the minting process reset an authenticated watchdog timer (AWDT) that reboots and re-images the device from a hardware-protected recovery operating system if the timer expires. The health tickets are written to a secure channel using a symmetric key that is provisioned by repurposing an existing Intel SGX (Software Guard Extension) Versioning Support protocol that enables migration of secrets between enclaves that have the same author. In the event that the enclave fails to make forward progress and health tickets are not minted, then the AWDT expires and forces the reboot and re-imaging to a known good state to evict the malware from the computing device.

In various illustrative embodiments, the health tickets are generated locally on the computing device using a ticket minting process that runs in a secure runtime environment such as an Intel SGX (Software Guard Extensions) enclave, a virtual machine protected by AMD SEV (Secure Encrypted Virtualization), or an ARM TrustZone environment that runs on a processor. The ticket minting enclave may optionally perform various runtime health and integrity checks of computing device state when determining whether to generate a health ticket. The ticket minting enclave may optionally be in contact with a trusted, centralized authority, such as a cloud provider, to determine whether the centralized authority deems the computing device operational and in good state. If this is not the case, the ticket minting enclave will not generate a health ticket.

The logic that checks for the health tickets runs in a secure environment that has two properties. First, this environment runs periodically to check for the presence of a fresh health ticket; this periodic check cannot be turned off or disrupted even if the system becomes compromised. Second, this environment can reboot and re-image the entire computing platform with a clean, recovery environment. One example of such a secure environment is an x86 mode called System Management Mode (SMM) that can enable trusted UEFI (Unified Extensible Firmware Interface) firmware, a trusted UEFI enclave, and other trusted code to run in parallel with an untrusted OS on the computing device.

The processor is configured to receive a System Management Interrupt (SMI) periodically. Once configured, an SMI cannot be disabled even if the rest of the system becomes compromised. When invoked, the System Management Interrupt executes SMM code to instantiate a trusted SMI handler that executes as a runtime part of the UEFI. The SMI handler checks for the presence of a fresh health ticket. If the ticket is valid, the SMI code deems the computing platform in good state and lets the rest of the system resume operation. If the ticket is invalid or absent, SMI manages the reboot and re-imaging processes from the recovery OS. Health tickets are cryptographically protected using a symmetric key that is commonly shared by the ticket minting enclave and SMI handler and written to the secure delivery channel.

The commonly-shared symmetric key is provisioned by repurposing an existing Intel SGX Versioning Support protocol that enables migration of secrets between enclaves that have the same author (e.g., the UEFI and health ticket minting enclaves). In a pre-boot process on the computing device, the UEFI initiates the UEFI-based enclave using a secure enclave runtime environment such as an Intel SGX enclave. The symmetric key is generated by the UEFI enclave and stored in hardware-protected memory which may be subsequently accessed by the UEFI and SMI handler. In a post-boot process, the untrusted OS initiates the health ticket minting enclave that generates the commonly-shared symmetric key using Intel SGX Versioning Support and stores it in processor reserved memory (PRM) that is inaccessible to other software including the untrusted OS.

Utilization of a trusted SMI handler in the UEFI runtime and the SGX enclaves advantageously solves a long-felt problem in computer science in which safety is provided a trusted computing base, but liveness cannot be guaranteed. The present solution guarantees liveness—either the OS schedules an enclave or if it does not, then a reboot and re-imaging a known good state is performed to ensure the enclave runs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
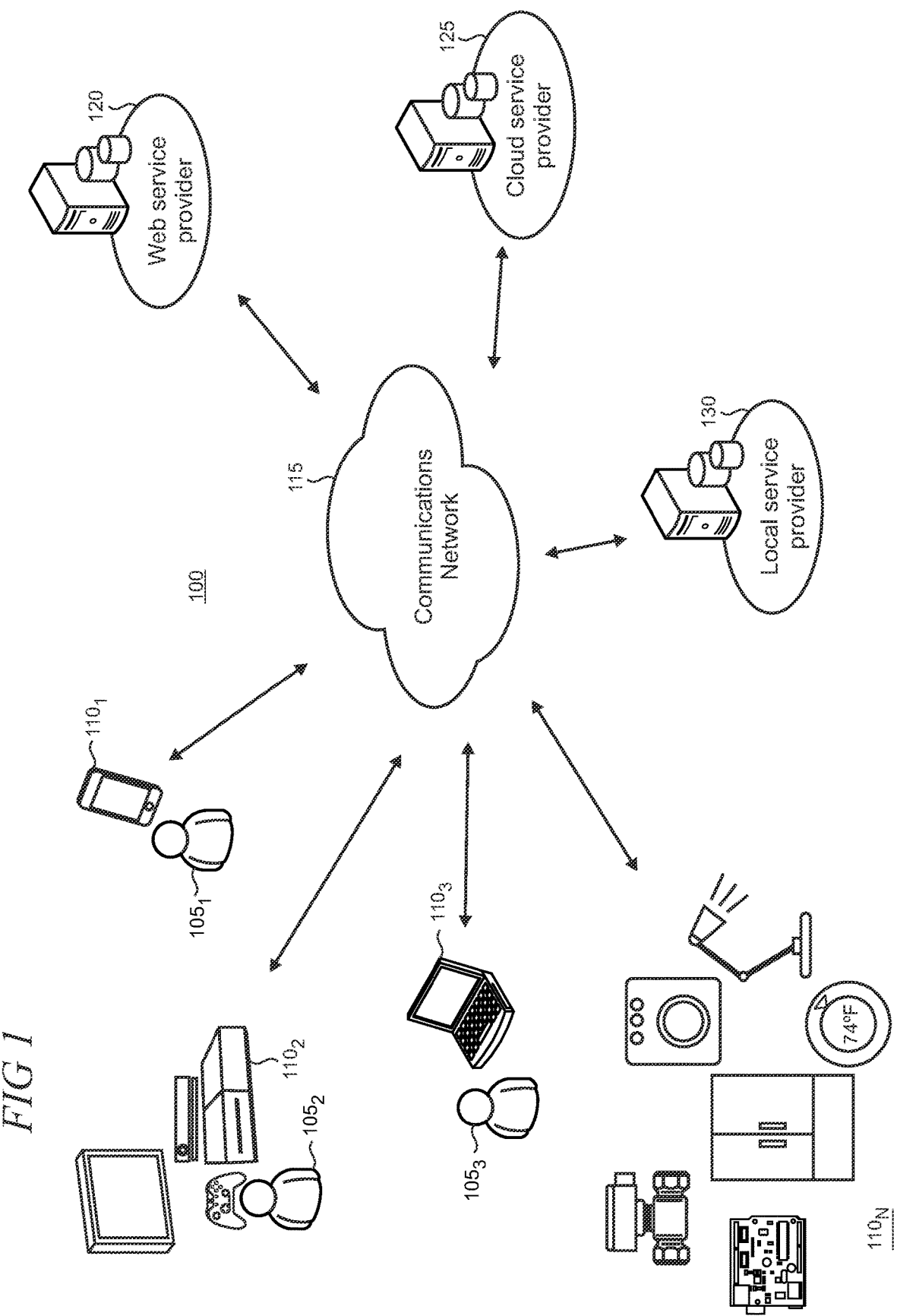
FIG. 1 shows an illustrative computing environment in which various computing devices interact with services over a communications network

FIG. 1 shows an illustrative computing environment 100 in which the same or different customers and/or users 105 may employ various computing devices 110 that communicate over a communications network 115 to access services, applications, and data that are supported by one or more providers of local services 130, cloud-based services 125, and web services 120. The computing devices may utilize locally-implemented operations and/or data storage or remotely-implemented operations and/or data storage, either alone, in combination with other computing devices, or in combination with the services. The computing devices can be utilized by individual users 105 or be organized as part of an enterprise in which the users are members or employees of the enterprise. Some computing devices may be part of a larger enterprise, device, or machine, or be utilized in a process or operation. For example, computing devices can be used throughout a manufacturing facility or in an industrial process. Some computing devices can be operated by other devices, systems, and processes, and/or are not necessarily directly controlled by a user.

The computing devices 110 can support two-way communications and data-consuming applications such as web browsing and multimedia (e.g., music, video, etc.) consumption in addition to various other features. The computing devices may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices may also be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. IoT devices can include household devices such as appliances as well as industrial devices such as sensors, valves, actuators, machines, and the like. In the discussion that follows, the use of the term "computing device" is intended to cover all devices that perform some computing operations, whether they be implemented locally, remotely, or by a combination of local and remote storage.

The various computing devices 110 in the environment 100 can support different features, functionalities, and capabilities. Some of the features supported on a given computing device can be like those supported on others, while other features may be unique to a given computing device. The degree of overlap and/or distinctiveness among features supported on the various computing devices can vary by implementation. For example, some computing devices can support touch controls, gesture recognition, and voice commands, while others may enable a more limited user interface, or may provide no user interface at all. Some computing devices may support video consumption and Internet browsing, while other computing devices may support more limited media handling and network interface features.

The computing devices 110 can typically utilize the communications network 115 to access and/or implement various functionalities. The network can include any of a variety of network types and network infrastructure in various combinations or sub-combinations including local-area networks (LANs), wide-area networks (WANs), cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. The network infrastructure can be supported, for example, by mobile operators, enterprises, Internet service providers (ISPs), telephone service providers, data service providers, and the like.

The communications network 115 may utilize portions of the Internet (not shown) or include interfaces that support a connection to the Internet so that the computing devices 110 can access data or content and/or render user experiences provided by various remote or cloud-based services 125 and web services 120. The cloud-based services 125 and web services 120 can support a diversity of features, services, and/or user experiences.

Figure 2:
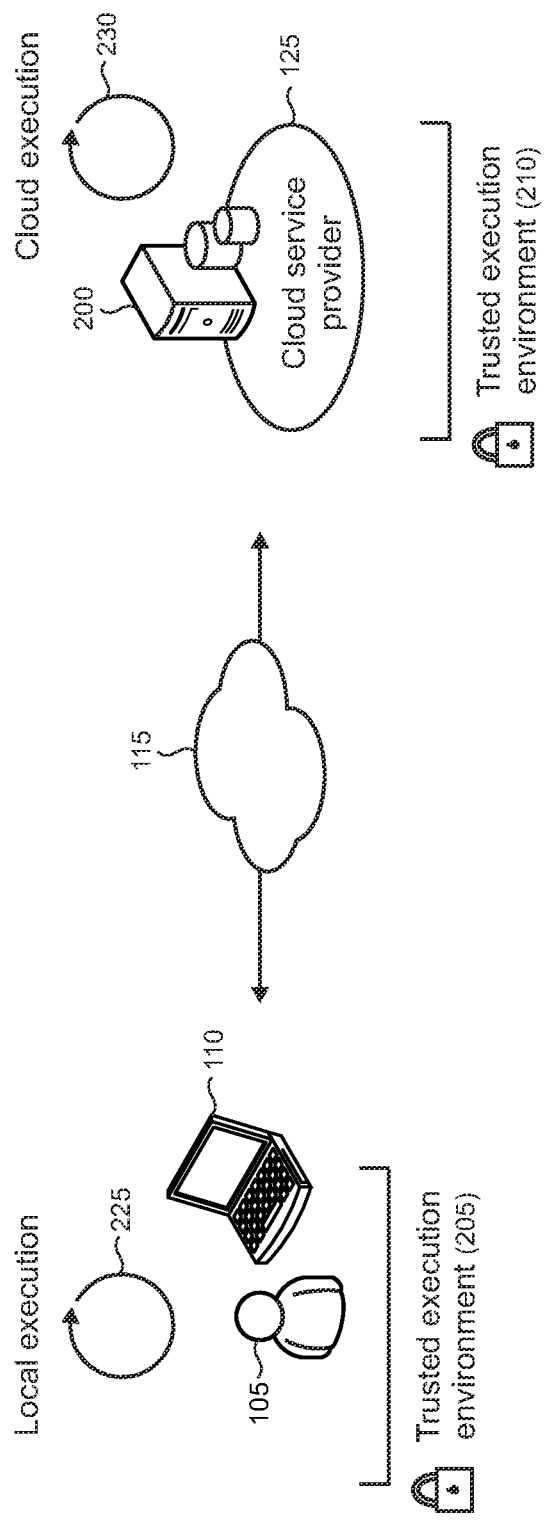
FIG. 2 shows illustrative computing devices that operate in a trusted execution environment (TEE)

FIG. 2 shows an illustrative local computing device 110 used by a user 105 and an illustrative remote computing device 200 utilized by a cloud-based service provider 125 such as a server or other computing infrastructure. The computing devices may operate in respective trusted execution environments (TEEs) 205 and 210. TEEs are typically configured to provide an isolated area of hardware and software that ensures data is stored, processed, and protected with respect to confidentiality and integrity within a context of trust. The local computing device 110 can interact with the cloud-based service provider 125 over the network 115 in which such interactions can involve local execution of code, application, or a process (as indicated by reference numeral 225), remote execution 230, or a combination of local and remote execution.

Figure 3:
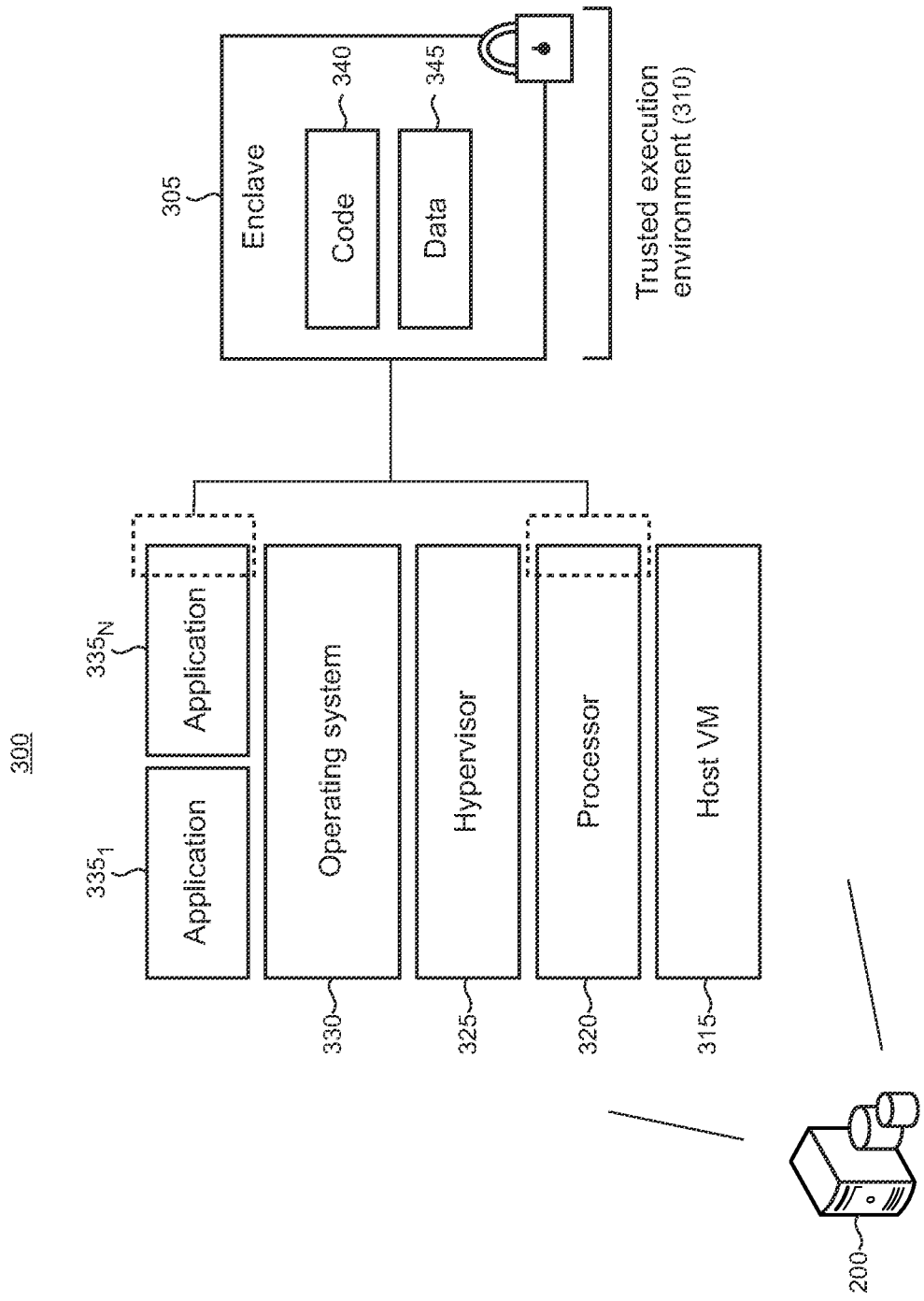
FIG. 3 shows an illustrative architecture for a secure enclave that may be instantiated on a computing device.

FIG. 3 shows an illustrative example of an architecture 300 that operates on a computing device 200 using a virtual machine (VM) computing paradigm that provides an enclave 305 that supports a TEE 310. It is emphasized that FIG. 3 shows one particular exemplary enclave and that the present principles may also be applied to enclaves in TEEs that operate in non-VM environments such as TEE 205 on the laptop computing device 110 shown in FIG. 2.

In this illustrative example, a host VM 315 runs on an Intel processor 320 with SGX and supports a hypervisor 325, operating system (OS) 330, and one or more applications 335. The processor may be a part of the x86 family, however, it will be appreciated that the principles described herein may be applicable to other processor families with suitable modifications.

A part of the hardware of the processor 320 is reserved for a portion of code 340 and data 345 in an application, as indicated by the dashed rectangles in the drawing. The enclave 305 is implemented using secured portions of the server's hardware. There is no way to view data or code inside the enclave, even with a debugger. If untrusted code attempts to modify the content in enclave memory, the environment gets disabled, and the operations are denied. Thus, the enclave functions as a secured box that contains encrypted code and data. From the outside of the box, nothing can be seen. The enclave is provided with a key to decrypt the data and the data is then processed and encrypted again before being sent out of the enclave. The key provisioning process is described below in the text accompanying FIGS. 12 and 13.

Figure 4:
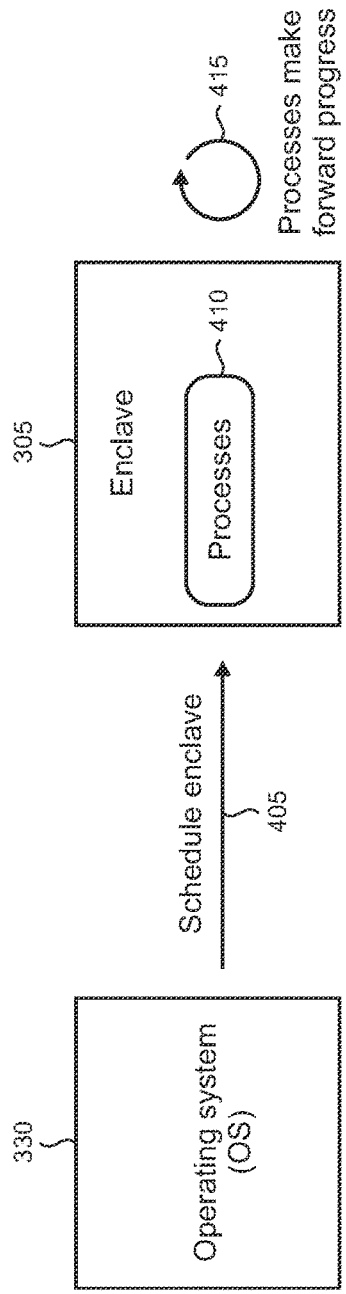
FIG. 4 shows an illustrative normal usage scenario for an enclave.

In a normal use scenario 400, as shown in FIG. 4, the OS 330 schedules an enclave 305 using processes to create the enclave, load code 340 (FIG. 3) and data 345, perform attestation, enable user mode execution, etc., using conventional SGX instructions, as indicated by arrow 405. Processes 410, for example those associated with an application 335 (FIG. 3), can execute normally in the enclave to make forward progress, as indicated by reference numeral 415. The processes running in the enclave may thereby be characterized with a liveness property.

Figure 5:
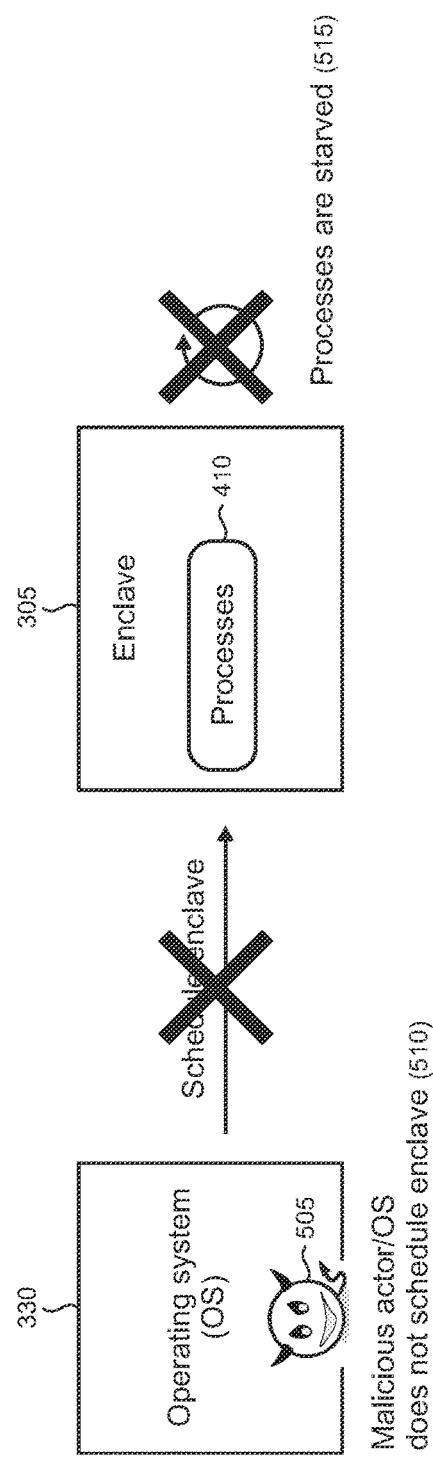
FIG. 5 shows an illustrative denial-of-service scenario for an enclave.

FIG. 5 shows an illustrative denial-of-service scenario 500 in which the OS 330 is compromised, for example, by a malicious actor 505. As indicated by reference numeral 510, the compromised OS does not schedule the enclave 305. The enclave does not make forward progress and the processes 410 are starved, as indicated by reference numeral 515. While the code and data are safe in the enclave, liveness is not guaranteed in the denial-of-service scenario because the enclave never gets a chance to run. Conventionally, there is no way to force the OS to schedule the enclave.

Figure 6:
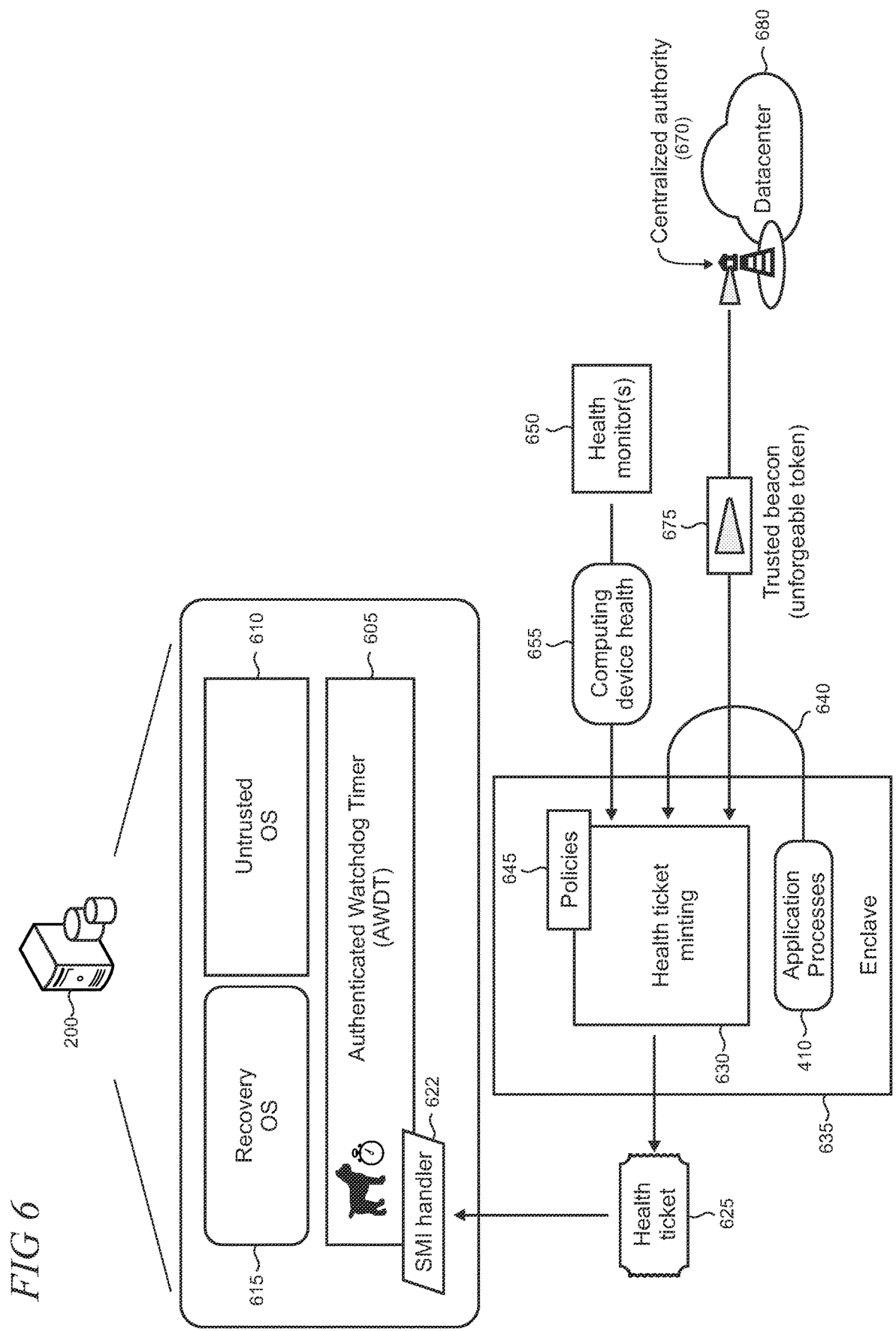
FIG. 6 shows illustrative components that may be utilized in a computing device including an operating system (OS) and a secure enclave.

The denial-of-service scenario 500 may be advantageously avoided to ensure liveness of the enclave using an authenticated watchdog timer (AWDT) 605, as shown in FIG. 6, that is utilized to cause the computing device 200 to reboot and re-image from a recovery OS 615 when it counts down to some predetermined value (e.g., zero). The starting value of the timer can vary by implementation. As shown, the computing device includes an untrusted OS 610. The recovery OS 615 resides in a read-only disk partition where the read-only property is hardware-enforced, thus isolating it from the untrusted OS. In this illustrative example, the computing device 200 comprises one or more processors in the x86 family, however, it will be appreciated that the principles described herein may be applicable to other processor families with suitable modifications and/or secure execution environments supported on other computing platforms.

The AWDT 605 may be implemented in software (e.g., firmware), hardware, or a combination of software and hardware. The execution of the AWDT is protected so that other software and processes on the computing device cannot interfere or disrupt the countdown of the timer. Accordingly, the AWDT implements trusted processes that may be protected from attack using one or more of execution protection, memory protection, and the like.

In this illustrative example, the AWDT 605 may be configured using code that executes in System Management Mode (SMM). SMM is a special privileged x86 processor execution mode which provides an SMI handler 622 as a service that may communicate information to a service consumer during OS runtime. The SMI handler can be programmed to execute periodically effectively implementing a timer that counts down, for example, to zero. In other applications, the AWDT$1) may execute on, or be implemented using, a separate processor from the main processors of the computing device (e.g., the processors that execute the operating system and applications), 2) may execute on the main processors as a separate process, or 3) be a regular process executing on the main processors of the computing device 200.

The AWDT 605 may be reset, so that the timer is incremented upwards to thereby delay the reboot and re-imaging, with a single-use health ticket 625 produced on the computing device 200 using a locally-executing health ticket minting process 630. The health ticket minting process can be run in parallel along with other processes 410 in a secure runtime environment such as the enclave 305. Secure runtime environments can include an Intel SGX enclave, a virtual machine protected by AMD SEV, or an ARM TrustZone environment. For example, the processes may be associated with one or more of the applications 335 (FIG. 3). An enclave in which the health ticket minting process is executed is referred to by reference numeral 635 in the description that follows.

In some implementations, the health ticket minting process 630 may be configured to monitor forward progress of the application processes 410, as indicated by reference numeral 640. For example, even though they are running in a secure enclave, the application processes may get stalled for some reason such that forward progress falls below some predetermined threshold which may be defined by one or more policies 645. The health ticket minting process can withhold health ticket minting to thereby force rebooting and re-imaging of the computing device 200 to a known good state in such a scenario.

In an optional arrangement, the health ticket minting process 630 may be configured to interface with one or more health monitors 650 that are arranged to collect and report various data 655 dealing with the health of the computing device. The health monitors may be implemented using trusted and/or secure processes and/or hardware. For example, the health monitors may execute in an SGX enclave using a hardware-enforced isolated address space.

For example, the health monitors 650 can be internal or external to the computing device 200 and configured to continuously collect health data 655 that is pertinent to the configuration and operations of the device and/or other infrastructure used by the cloud service provider more generally. Typically, the monitored health data may be utilized by the health ticket minting enclave 635 to perform health checks by applying policies 645 or other rules that set predetermined thresholds of runtime health integrity below which a reboot and re-imaging is performed. The policies may consider a number of factors to determine health of the monitored systems. Such factors may include, for example, software versions that are running, computing device behaviors and utilization of resources (e.g., network, storage, and compute resources), the time elapsed since last reboot, detection of known malware, and the like.

In an optional arrangement, the computing device 200 may be configured to interface with a trusted centralized authority 670 such as a cloud provider datacenter 680, as illustratively shown in FIG. 6, or other centralized management arrangement. The centralized authority may be arranged to produce trusted beacons—unforgeable tokens that are signed by centralized authority—that deem the computing device as operational in a good state. The health ticket minting enclave 630 may utilize the trusted beacon from the centralized authority in ticket minting decision-making processes, as described below in the text accompanying FIG. 14.

Figure 7:
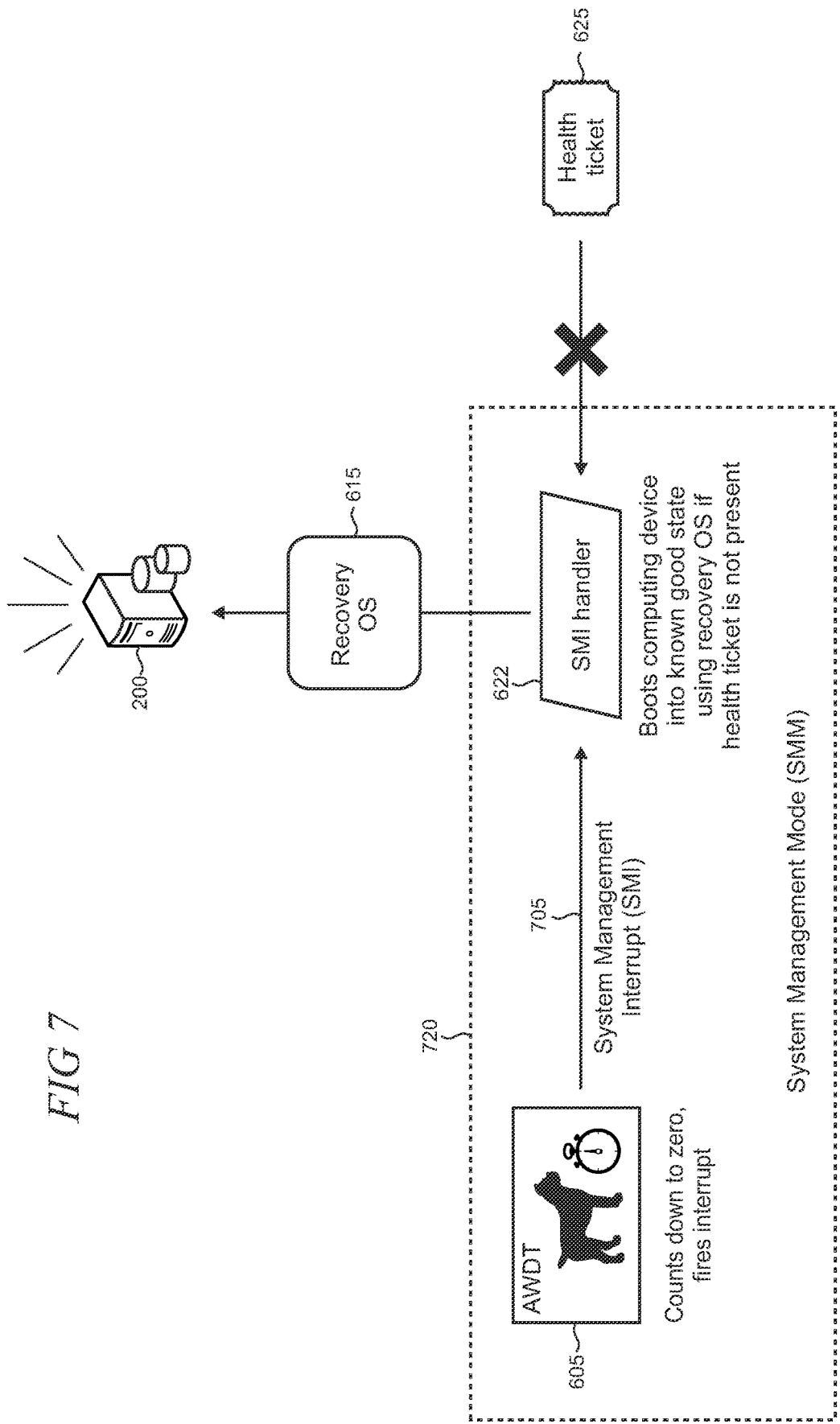
FIG. 7 shows an authenticated watchdog timer (AWDT) that is configured to fire an interrupt in System Management Mode (SMM) to reboot and recover a computing device into a known good state from a recovery operating system (OS)

As shown in FIG. 7, if the AWDT 605 is not reset by a health ticket 625, it will count down to a predetermined point when the next SMI 705 is fired and the SMI handler 622 will force a reboot and re-image of the computing device 200. The SMI is received by the SMI handler to initiate a process to reboot and re-image the computing device 200 from the recovery OS 615 to a known good state (shown in FIG. 7 as a "golden state" and indicated by reference numeral 715). Such reboot and re-imaging processes advantageously provide a capability to the computing device to unconditionally recover to a known good state within some finite time interval even in the presence of an active root-level adversary. As indicated by the dashed line 720, the AWDT 605 and SMI handler 622 may operate in SMM.

Figure 8:
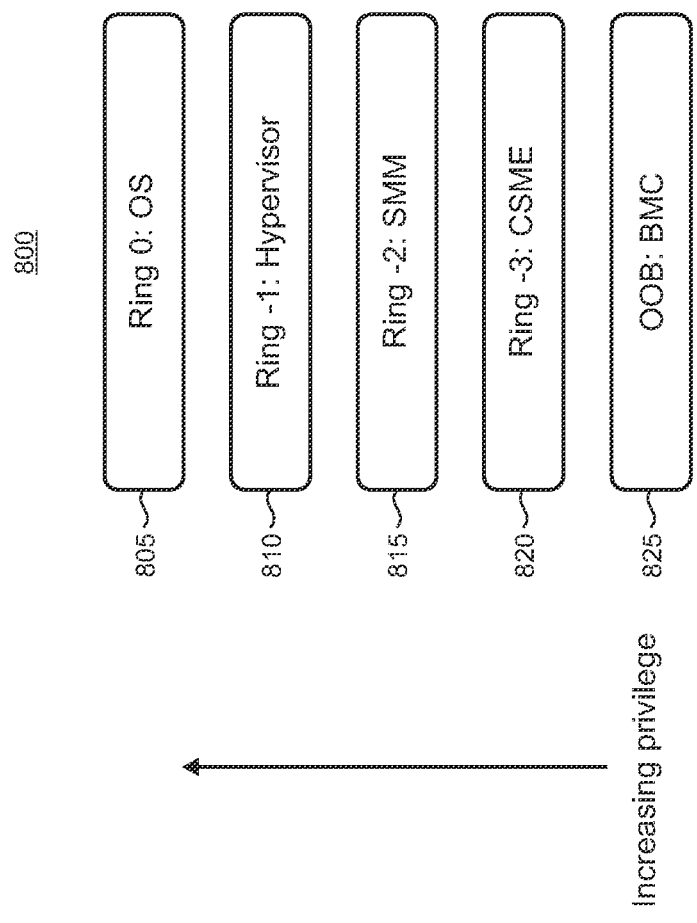
FIG. 8 shows an illustrative hierarchy of protection domains.

FIG. 8 shows an illustrative hierarchy 800 of ordered protection domains that are utilized in the x86 processor architecture with the highest level of privilege at the top. As shown, the OS runs in Ring 0 (as indicated by reference numeral 805), followed by the Hypervisor in Ring—1 (810). In Ring—2 (815), SMM is typically used by original equipment manufacturers (OEMs) of computing devices to interact with hardware such as non-volatile RAM (random access memory), emulate hardware functionality, handle hardware interrupts or errata, and perform other functions. SMM runs in the form of interrupt handlers that are triggered by timers or access to certain memory, registers, or hardware resources. OEM drivers and runtime firmware services may explicitly trap SMM to control certain hardware functionality. The processor runs SMM code in a separate address space and has access to System Management RAM (SMRAM) that enjoys special hardware protection that prevents less privileged software from accessing SMM code. While the OS and even the hypervisor may be compromised by malware/ransomware, the SMM remains trusted and can perform the present liveness guarantees.

Ring—3 (820) supports a Converged Security Management Engine (CSME) comprising an isolated 32-bit processor that runs as an embedded subsystem. On x86 processors, CSME is locked down by the CPU (central processing unit) vendor, such as Intel. Below Ring—3 in the hierarchy 800 is an out-of-band (OOB) (825) layer comprising a Baseboard Management Controller (BMC) that runs in a separate processor using Linux that can communicate with the host processor on the computing device. BMC is commonly utilized to manage data center servers remotely.

Using SMM in Ring—2 for the AWDT 605 (FIG. 6) advantageously avoids potential issues with implementation in the OS or hypervisor that could become compromised with malware. The SMM implementation also provides greater extensibility across computing device manufacturers compared to BMC and CSME. In addition, utilization of SMM minimizes the trusted computing base of the present liveness guarantees solution relative to those using hypervisor, BMC, or CSME which expose larger attack surfaces.

Figure 9:
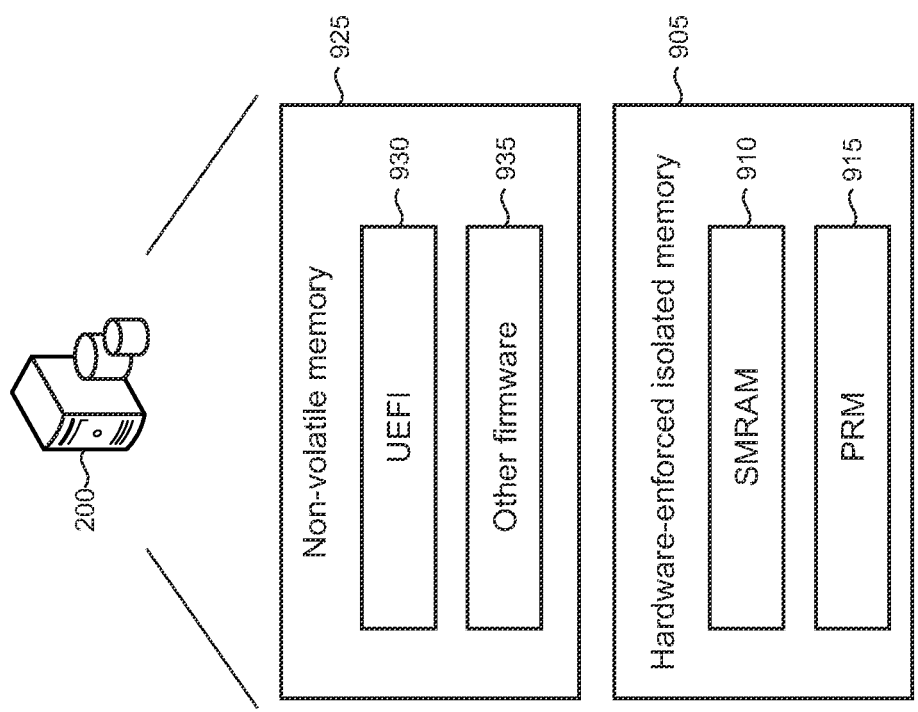
FIG. 9 shows illustrative memory resources of a computing device.

FIG. 9 shows illustrative memory resources of a computing device 200. As noted above, the SMM has access to an area of hardware-enforced isolated memory 905 referred to as SMRAM 910. SGX enclaves, such as the health ticket minting enclave 635 (FIG. 6), utilize Processor Reserved Memory (PRM) (915) which provides hardware-enforced isolation from software running outside the enclave to prevent it from accessing memory that does not belong to it. Specifically, non-enclave software is only allowed to access memory outside the PRM range, while the code inside an enclave is allowed to access non-PRM memory, and the parts of PRM (i.e., enclave page cache (EPC) pages) that are owned by that enclave.

In addition to the SMRAM 910 and PRM 915 that are implemented using dynamic RAM (DRAM), the computing device 200 includes non-volatile (i.e., flash) memory 925 that stores a signed copy of the Unified Extensible Firmware Interface (UEFI) firmware 930 that contains boot code and the code that executes in SMM. To load this firmware, a secure boot process validates the signature of the firmware stored on flash. This ensures that modified firmware is not being loaded on the platform. Other non-UEFI firmware 935 may also be utilized by the computing device in some cases.

Figure 10:
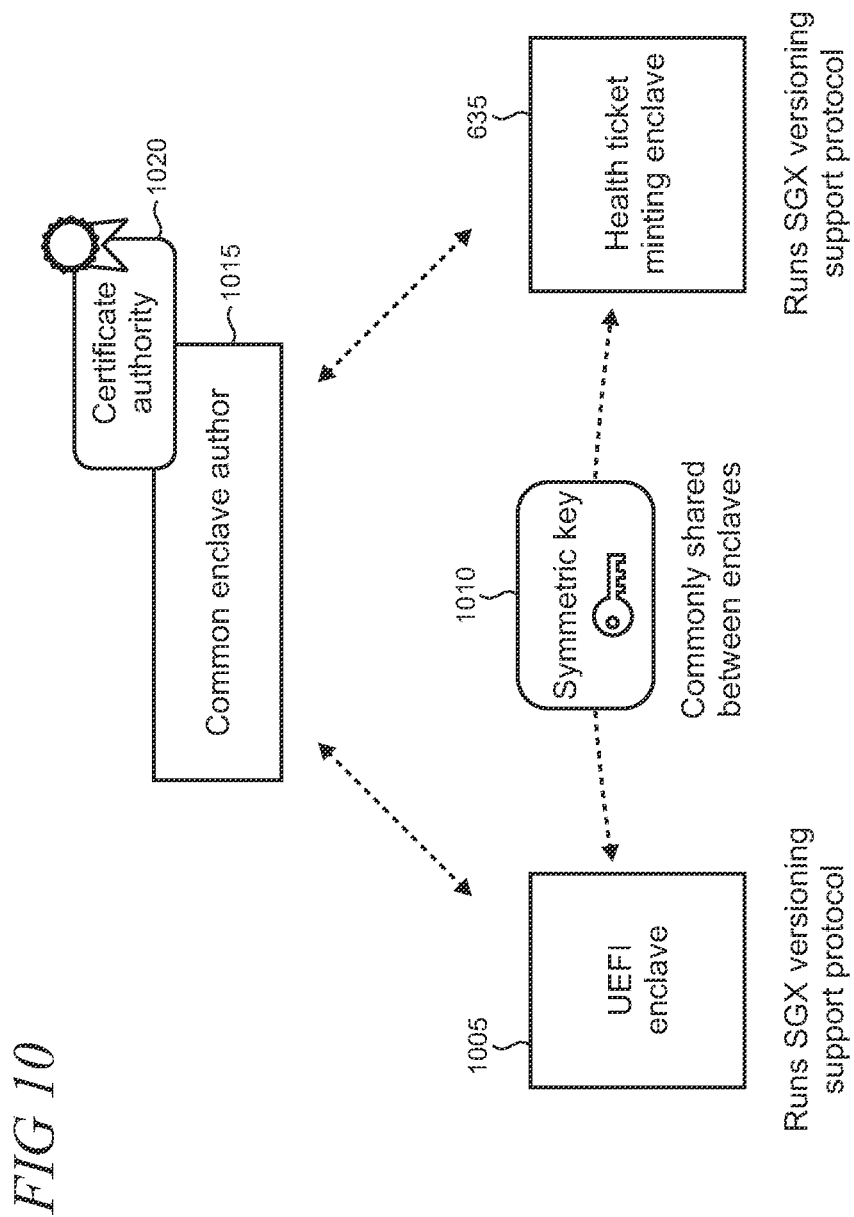
FIG. 10 shows a symmetric key that may be commonly shared between enclaves that have the same enclave author.

Execution of the UEFI code enables initialization of a UEFI enclave 1005 that facilitates creation of a symmetric key 1010 shared between the UEFI enclave and the health ticket minting enclave 635, as shown in FIG. 10. Such provisioning of a common symmetric key is enabled for SGX enclaves using a one-level certificate hierarchy in which the common author 1015 for each enclave is a Certificate Authority (CA) 1020.

Figure 11:
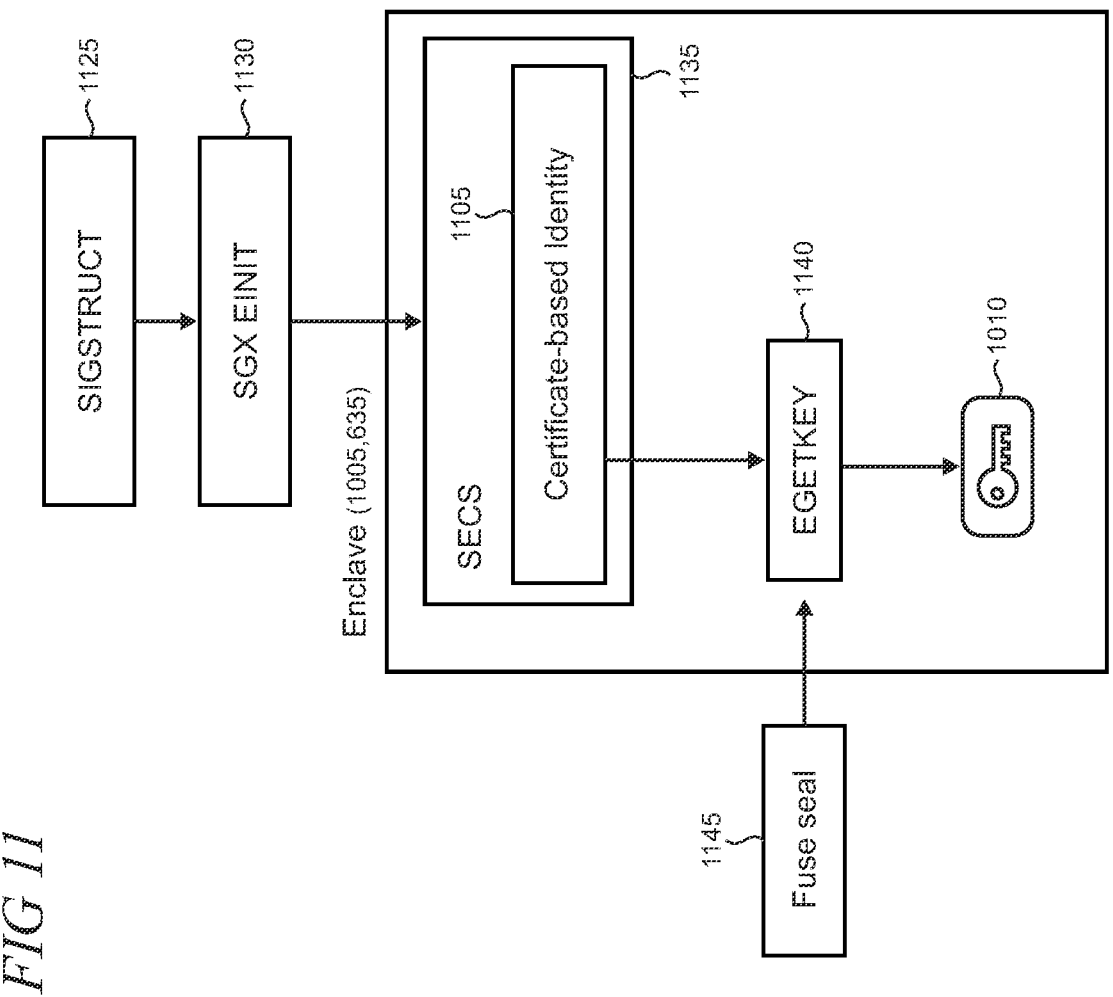
FIG. 11 shows an illustrative certificate-based enclave identity arrangement.

As shown in FIG. 11, each SGX enclave (UEFI enclave 1005, and health ticket minting enclave 635) utilizes a certificate-based identity 1105 in which a certificate 1125 is formatted with Signature Structures (SIGSTRUCT). An initialization instruction, EINIT 1130, examines the target enclave's certificate and uses the information to populate the SECS (SGX Enclave Control Structure) field 1135 that describes the enclave's certificate-based identity. The enclave uses an EGETKEY instruction 1140 to derive the corresponding symmetric key 1010 based on its identity.

SGX enclaves utilize unique secrets generated randomly with strong entropy during x86 processor production, comprising two fuse keys including a Root Provisioning Key (RPK) and Root Sealing Key (RSK). The RSK value is used as the root for all EGETKEY derivations. Accordingly, the UEFI enclave 1005 and the health ticket minting enclave 635 are bound to the same computing device using a fuse seal 1145.

In conventional SGX enclave applications, the symmetric key 1010 is typically utilized in combination with cryptographic primitives to protect the confidentiality and integrity of an enclave's secrets while they are migrated to another enclave by an untrusted OS. For example, an SGX versioning support protocol may leverage the one-level certificate-based enclave identity scheme to facilitate migration of secrets between enclaves that are running different versions of the same software. For example, an upgraded version of software can use EGETKEY to retrieve keys created by former versions. Updated enclave instantiations can thus decrypt data sealed with keys of their former versions.

In contrast to its conventional use for migration of secrets between different versions of the same software, the SGX versioning support protocol is used in the present liveness guarantees in secure enclaves using health tickets to provide the symmetric key to enable a cryptographically secure channel to be established between the health ticketing minting enclave and the SMI handler (as discussed below and shown in FIG. 14).

Figure 12:
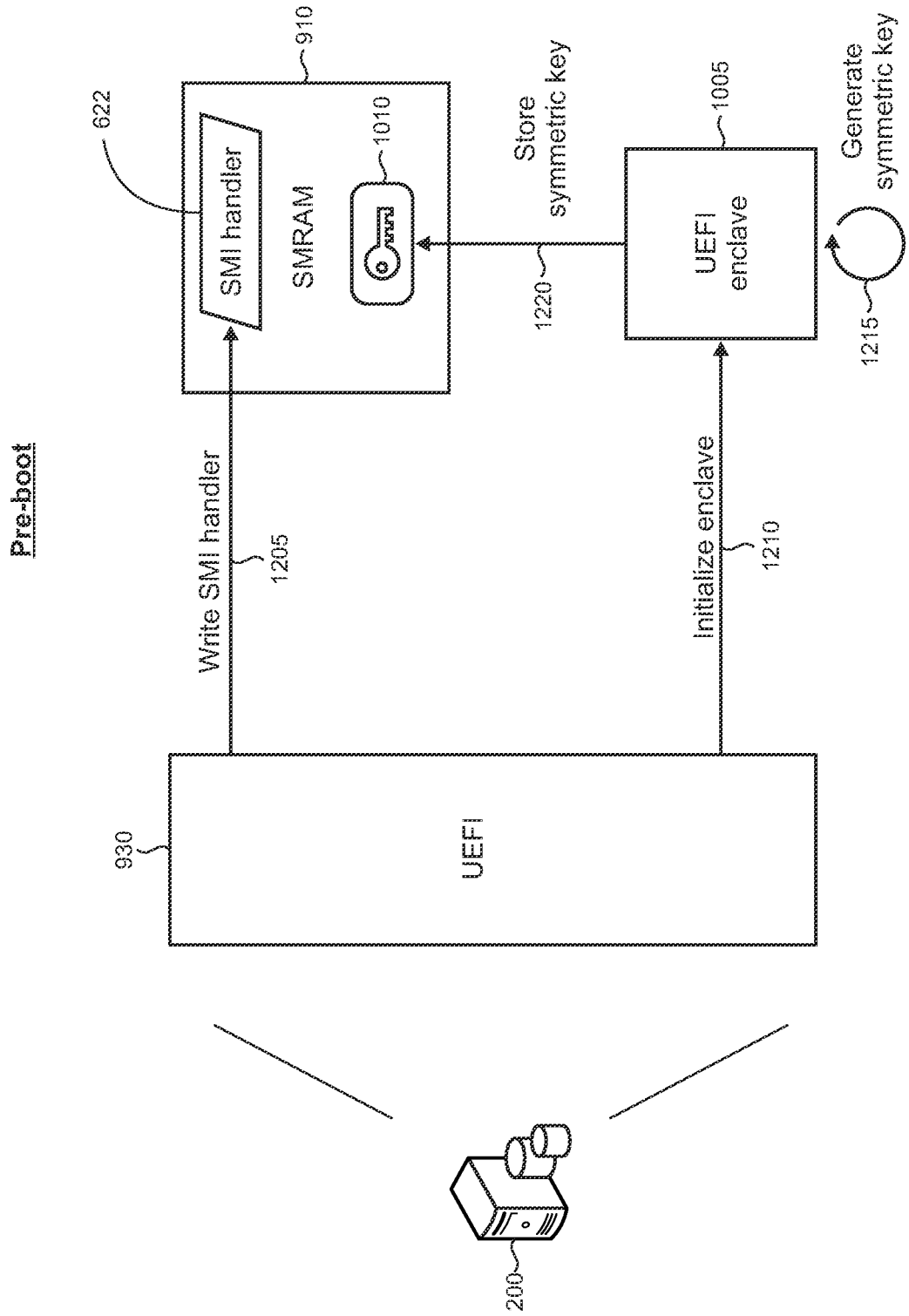
FIGS. 12 and 13 show illustrative symmetric key provisioning that is resilient against malware that may be executing in an untrusted OS.
Figure 13:
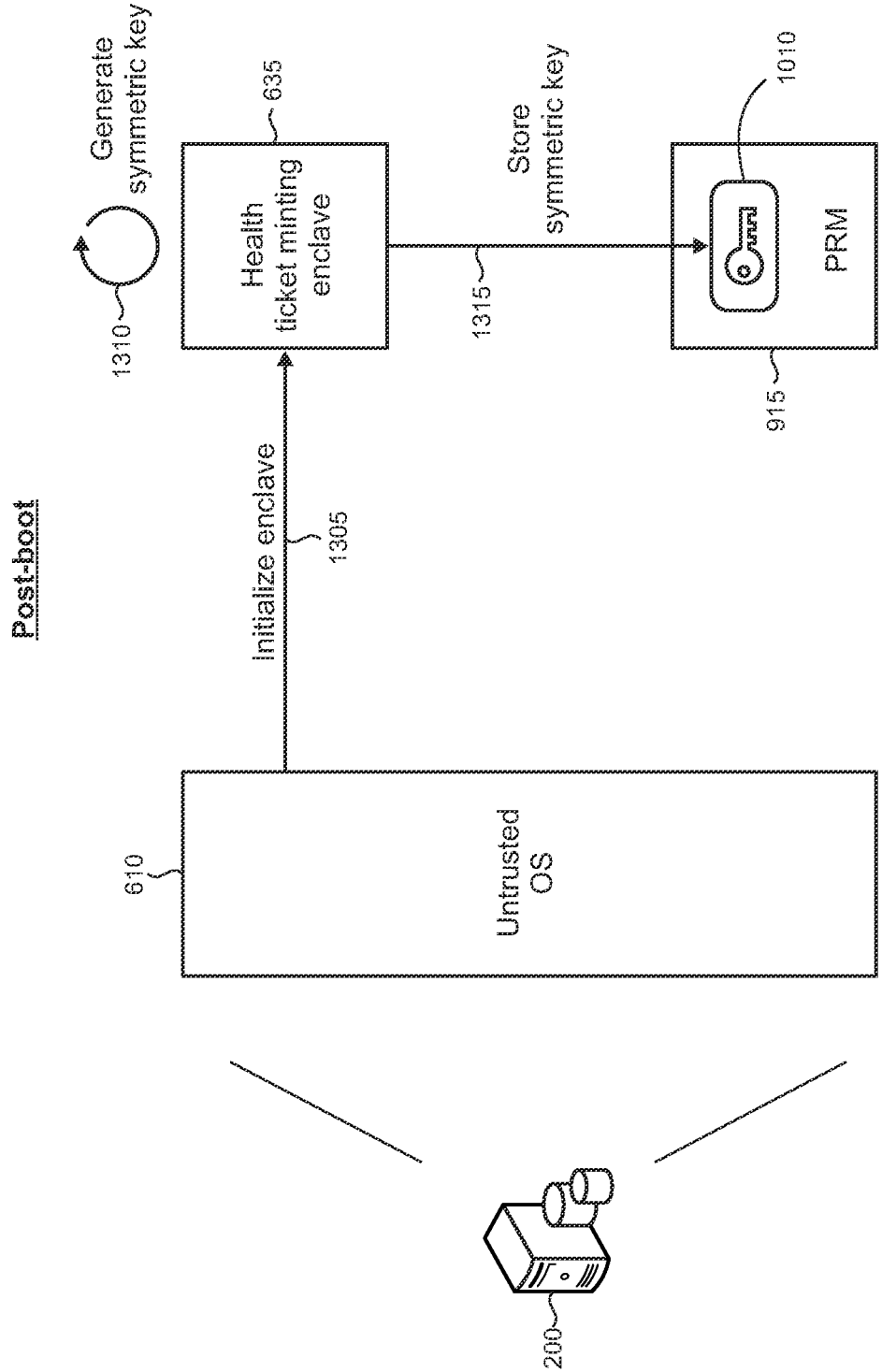

FIGS. 12 and 13 respectively show illustrative symmetric key provisioning for the SMI handler 622 and health ticket minting enclave 635. During a pre-boot phase of the computing device 200, as shown in FIG. 12, the UEFI 930 writes the SMI handler to the SMRAM 910 (as indicated by reference numeral 1205). The UEFI then initializes a UEFI enclave (1210), so that the symmetric key 1010 can be generated (1215) and stored in the SMRAM (1220). During the pre-boot phase, all operations, including the passing of the symmetric key between the UEFI enclave and SMRAM, are trusted operations.

In FIG. 13, during a post-boot phase of the computing device 200, the untrusted OS 610 initializes the health ticket minting enclave 635 (as indicated by reference numeral 1305). The health ticket minting enclave generates the symmetric key 1010 (1310) which, as described above, is the same key generated by the UEFI enclave. The symmetric key is stored by the enclave in the PRM 915 (1315) to thereby protect it from the untrusted OS.

Figure 14:
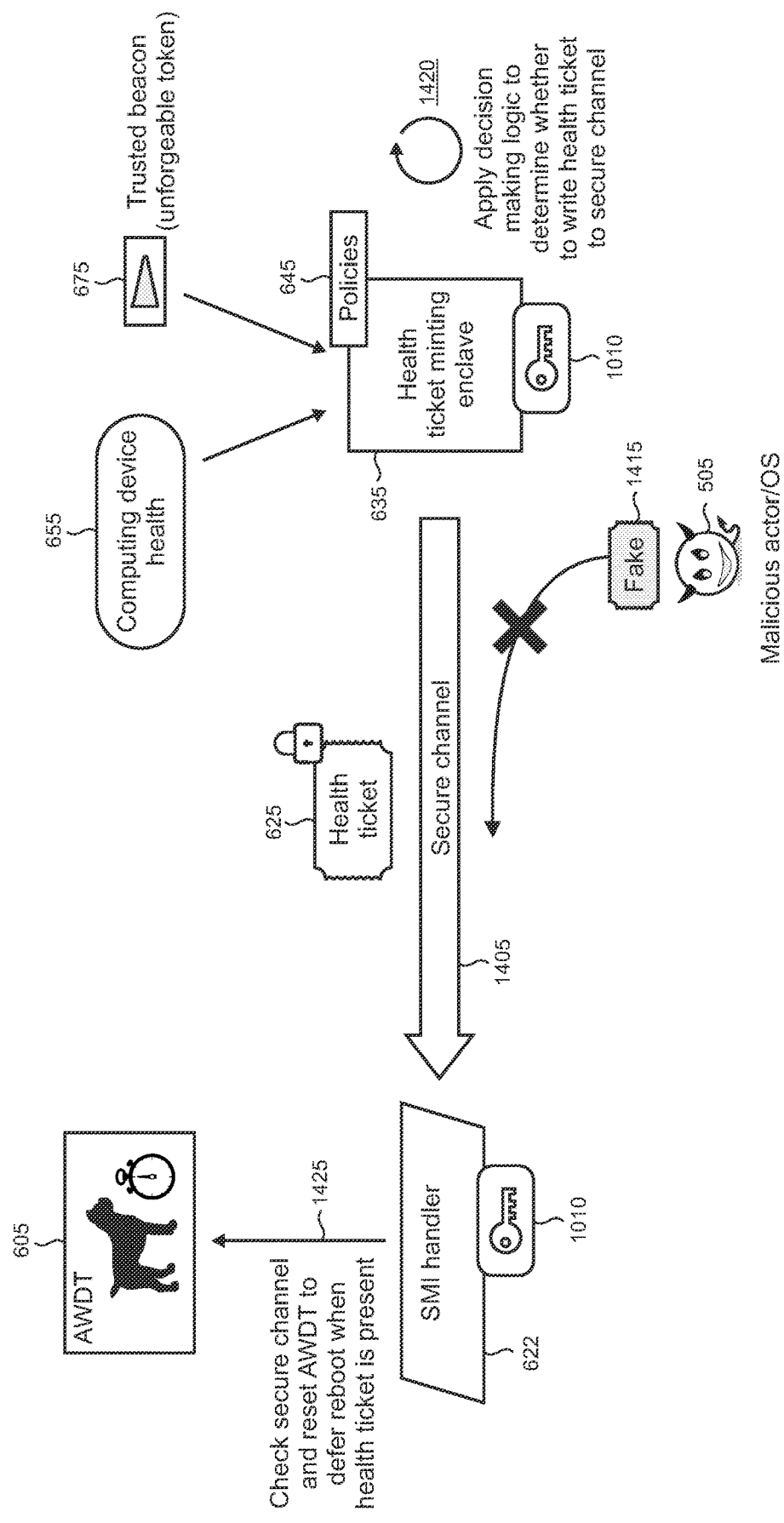
FIG. 14 shows an illustrative secure health ticket channel between a health ticket minting process that runs in an enclave and a Security Management Interrupt (SMI) handler.

FIG. 14 shows an illustrative secure health ticket channel 1405 that is established between the health ticket minting enclave 635 and the SMI handler 622 using the symmetric key 1010. The channel is cryptographically secured by the symmetric key that is accessible by both the ticket minting enclave and SMI handler. The cryptographic security prevents a malicious actor and/or operating system (collectively indicated by reference numeral 505) from spoofing or injecting a fake health ticket 1415 into the channel to attempt to inappropriately defer a reboot and re-imaging of the computing device which would otherwise cause the malicious actor to be evicted from the platform.

The health tickets 625 have security properties to uniquely bind them to the local computing device to prevent the injection of health tickets that are generated on a different compromised host. The health tickets are designed to be single-use to protect against replay and man-in-the-middle attacks, spoofing/impersonation, and the like. Application of a freshness criteria for the health tickets can ensure against ticket replication.

As indicated by reference numeral 1420, in an optional arrangement, the health ticket minting enclave 635 may apply decision making logic in view of applicable policies 645 to determine whether to write a health ticket 625 to the secure channel 1405 based on the monitored computing device health 655. If the computing device is determined to be sufficiently healthy per the policies, then the enclave mints a single-use health ticket which is written to the secure channel 1405 that is accessible by the SMI handler 622. In addition, or alternatively, if the health ticket minting process is configured for monitoring the forward progress of other processes that are executing in the enclave (e.g., application processes 410 as shown in FIG. 4), then the enclave may mint a health ticket if forward progress for those processes occurs that meets a predetermined threshold, as described above.

When the AWDT 605 counts down to trigger an interrupt (i.e., SMI), the SMI handler 622 checks the secure channel 1405 for the presence of the health ticket 625 to responsively defer reboot, as indicated by reference numeral 1425. If a valid health ticket is absent, because the health ticket minting enclave has withheld minting of the ticket for any reason or the health ticket is not fresh according to some suitable freshness criteria, then the SMI handler, upon the AWDT counter counting down to some predetermined value (e.g., reaching zero), will force the computing device to reboot and re-image from the recovery OS, as discussed above with reference to FIG. 11. For example, the ticket minting enclave may be starved (i.e., liveness=0), or it may have determined from the health data 655 (FIG. 6) that the health of the computing device is below some threshold established by policies 645. If a valid ticket is present in the secure channel, then the SMI handler defers reboot and resets the AWDT by incrementing the counter upwards by some predetermined value. The particular value used can vary according to the needs of a given implementation where a shorter countdown implies more frequent determination of the runtime health of the computing device.

An alternative health ticket workflow may be utilized in some implementations. In this workflow, if the SMI handler 622 does not receive a health ticket from the secure channel 1405 prior to the AWDT 605 firing the interrupt, then the SMI handler forces the reboot and re-imaging of the computing device 200 (FIG. 6) from the recovery OS 615. The SMI handler will increment the AWDT whenever it receives a health ticket 625 over the secure channel to thereby prevent the AWDT from counting down and rebooting the platform during the firing of the interrupt. While the particular workflow can vary by implementation, the default behavior of the SMI handler to force the computing device to reboot and re-image from the recovery OS to the golden state is consistent among all implementations—without the health ticket being present, rebooting and re-imaging of the computing device is performed upon expiration of the timer.

The health ticket minting enclave 635 may also incorporate the presence of a fresh trusted beacon 675 in the decision making process 1420 in some embodiments. For example, if the trusted beacon is absent, the health ticket minting enclave can decide not to mint the health ticket which causes the computing device 200 to reboot and re-image when the AWDT 605 expires (e.g., counts down to zero).

Figure 15:
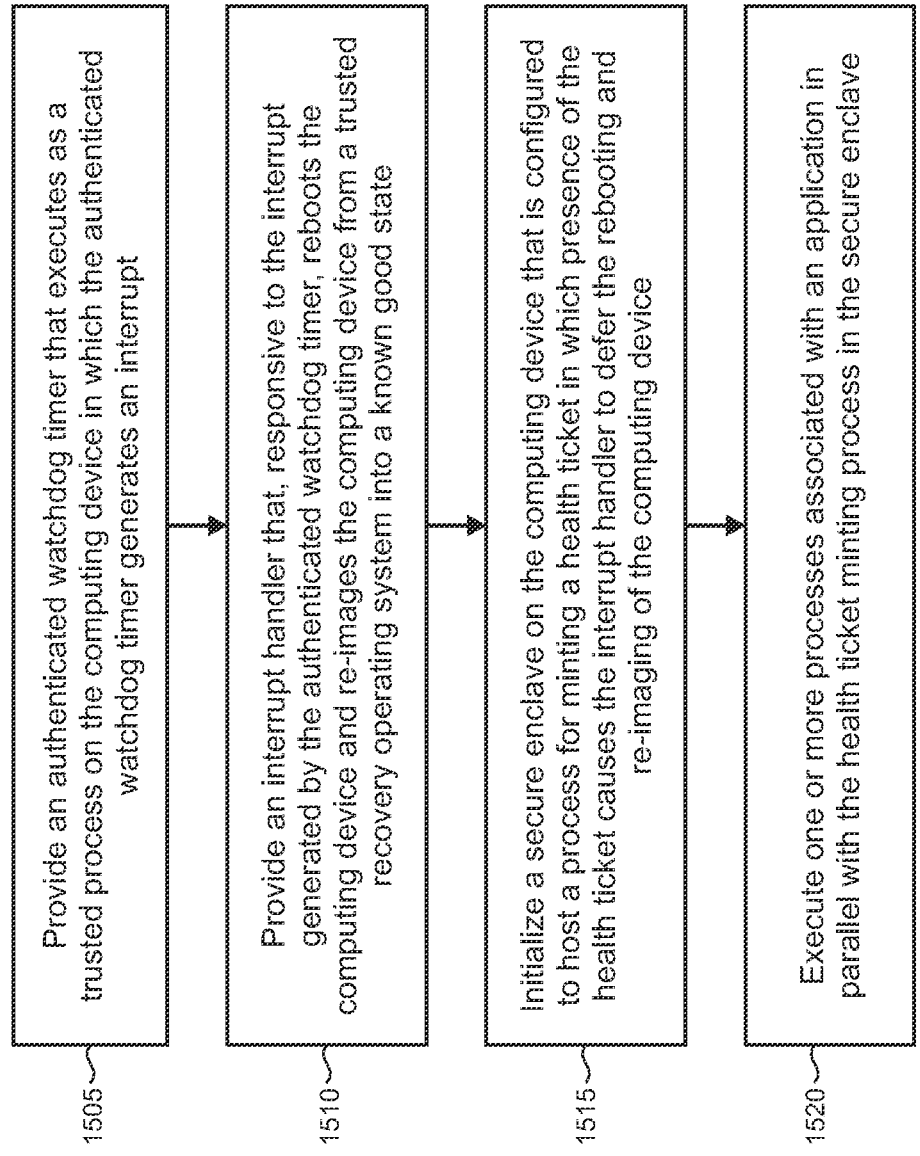
FIGS. 15, 16, and 17 show illustrative methods that may be performed when implementing the present liveness guarantees in secure enclaves using health tickets.

FIG. 15 is a flowchart of an illustrative method 1500 that may be executed on a computing device. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1505 of the method 1500 includes providing an authenticated watchdog timer that executes as a trusted process on the computing device in which the authenticated watchdog timer generates an interrupt. For example, if the AWDT's value is zero, the interrupt will cause the computing device to reboot. Block 1510 includes providing an interrupt handler that, responsive to the interrupt generated by the authenticated watchdog timer, reboots the computing device and re-images the computing device from a trusted recovery operating system into a known good state.

Block 1515 includes initializing a secure enclave on the computing device that is configured to host a process for minting a health ticket in which presence of the health ticket causes the interrupt handler to defer the rebooting and re-imaging of the computing device. Block 1520 includes executing one or more processes associated with an application in parallel with the health ticket minting process in the secure enclave.

Figure 16:
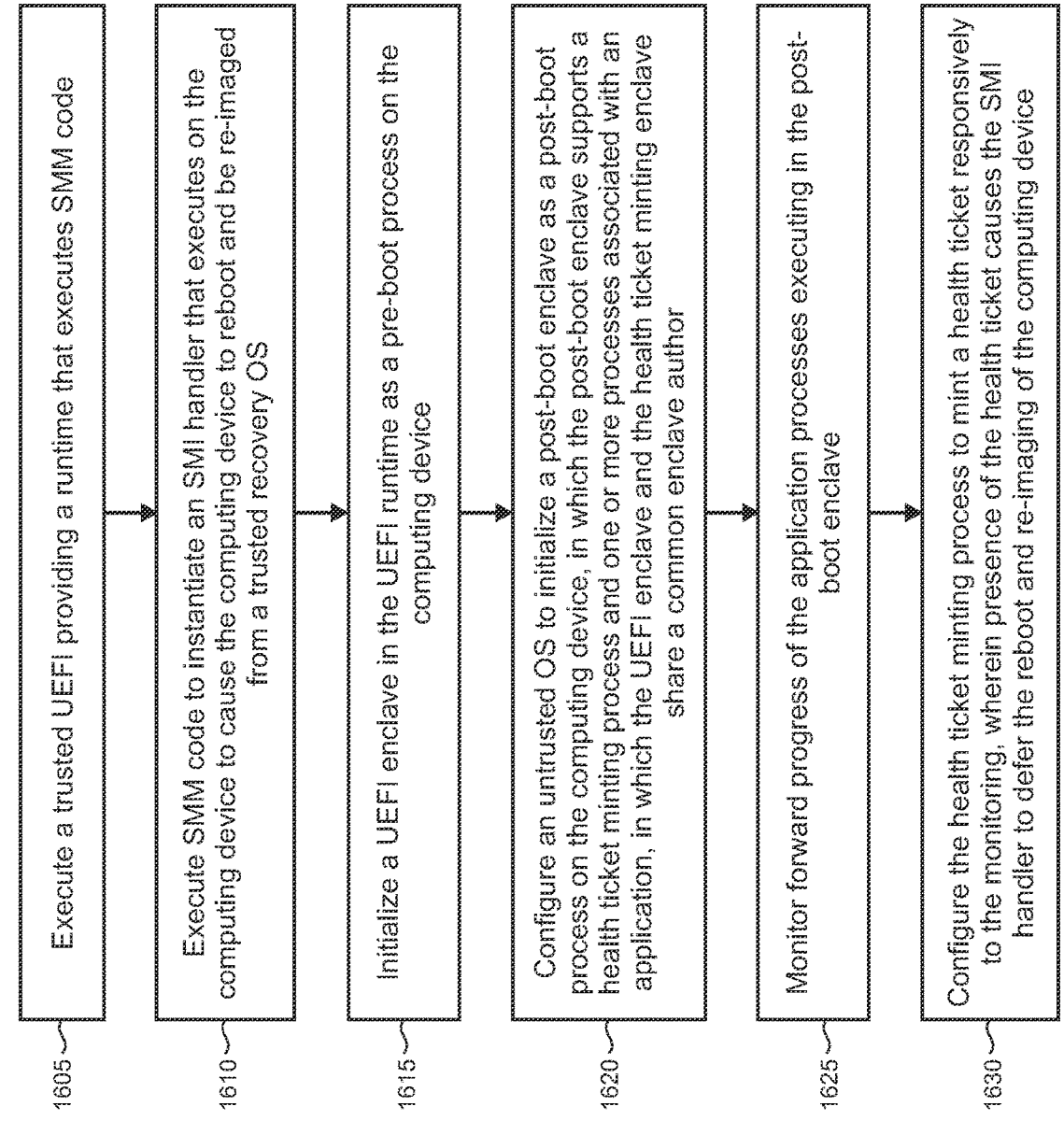

FIG. 16 is a flowchart of an illustrative method 1600 that may be performed by a computing device. At block 1605, a trusted UEFI is executed that provides a runtime that executes SMM code. At block 1610, SMM code is executed to instantiate an SMI handler that executes on the computing device to cause the computing device to reboot and be re-imaged from a trusted recovery OS.

At block 1615, a UEFI enclave is initialized in the UEFI runtime as a pre-boot process on the computing device. At block 1620, an untrusted OS is configured to initialize a post-boot enclave as a post-boot process on the computing device, in which the post-boot enclave supports a health ticket minting process and one or more processes associated with an application, in which the UEFI enclave and the health ticket minting enclave share a common enclave author.

At block 1625, forward progress of the application processes executing in the post-boot enclave are monitored. At block 1630, the health ticket minting process is configured to mint a health ticket responsively to the monitoring, wherein presence of the health ticket causes the SMI handler to defer the reboot and re-imaging of the computing device.

Figure 17:
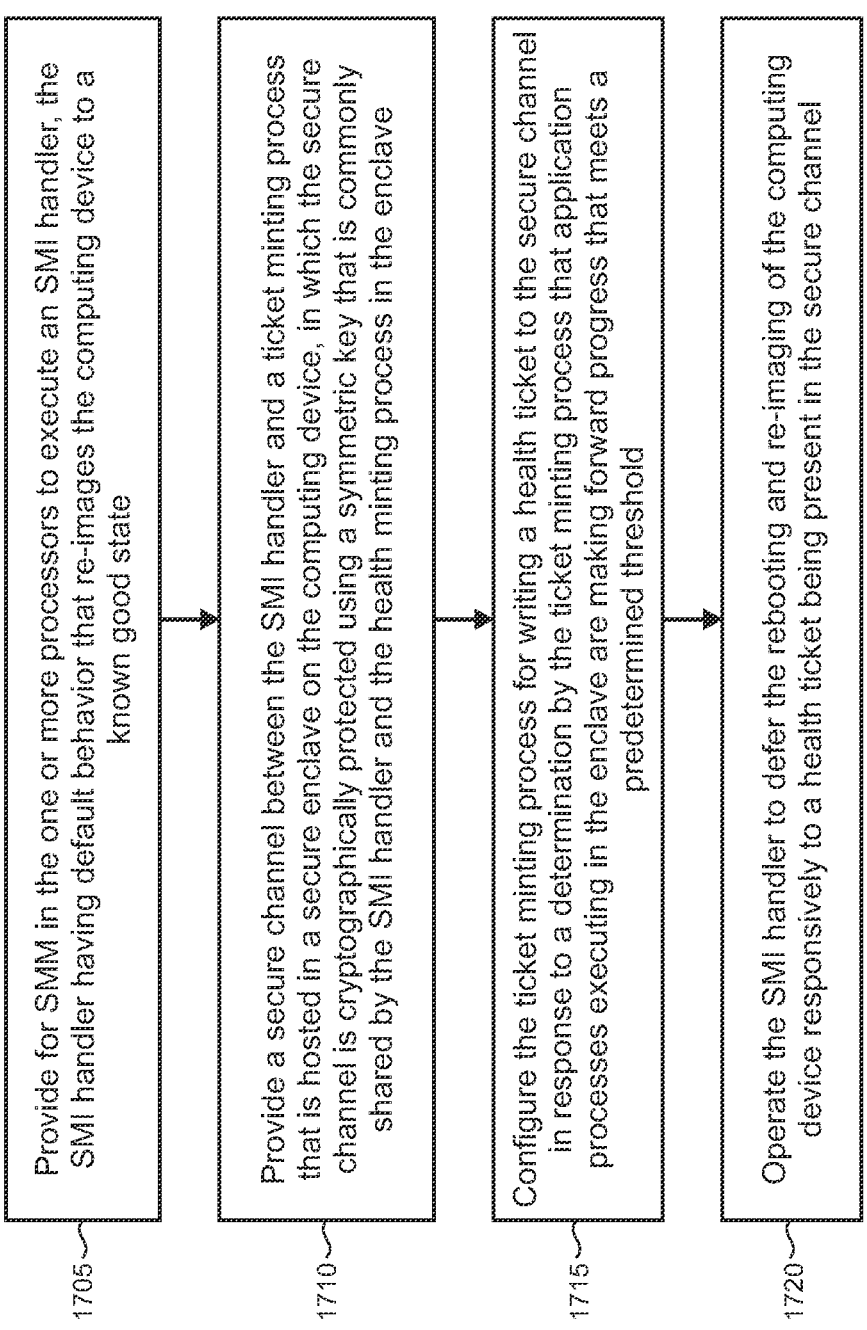

FIG. 17 is a flowchart of an illustrative method 1700 that may be performed by a computing device. At block 1705, SMM is provided for in the one or more processors to execute an SMI handler, the SMI handler having default behavior that re-images the computing device to a known good state.

At block 1710, a secure channel is provided between the SMI handler and a ticket minting process that is hosted in a secure enclave on the computing device, in which the secure channel is cryptographically protected using a symmetric key that is commonly shared by the SMI handler and the health minting process in the enclave.

At block 1715, the ticket minting process is configured for writing a health ticket to the secure channel in response to a determination by the ticket minting process that application processes executing in the enclave are making forward progress that meets a predetermined threshold. At block 1720, the SMI handler is operated to defer the rebooting and re-imaging of the computing device responsively to a health ticket being present in the secure channel.

Figure 18:
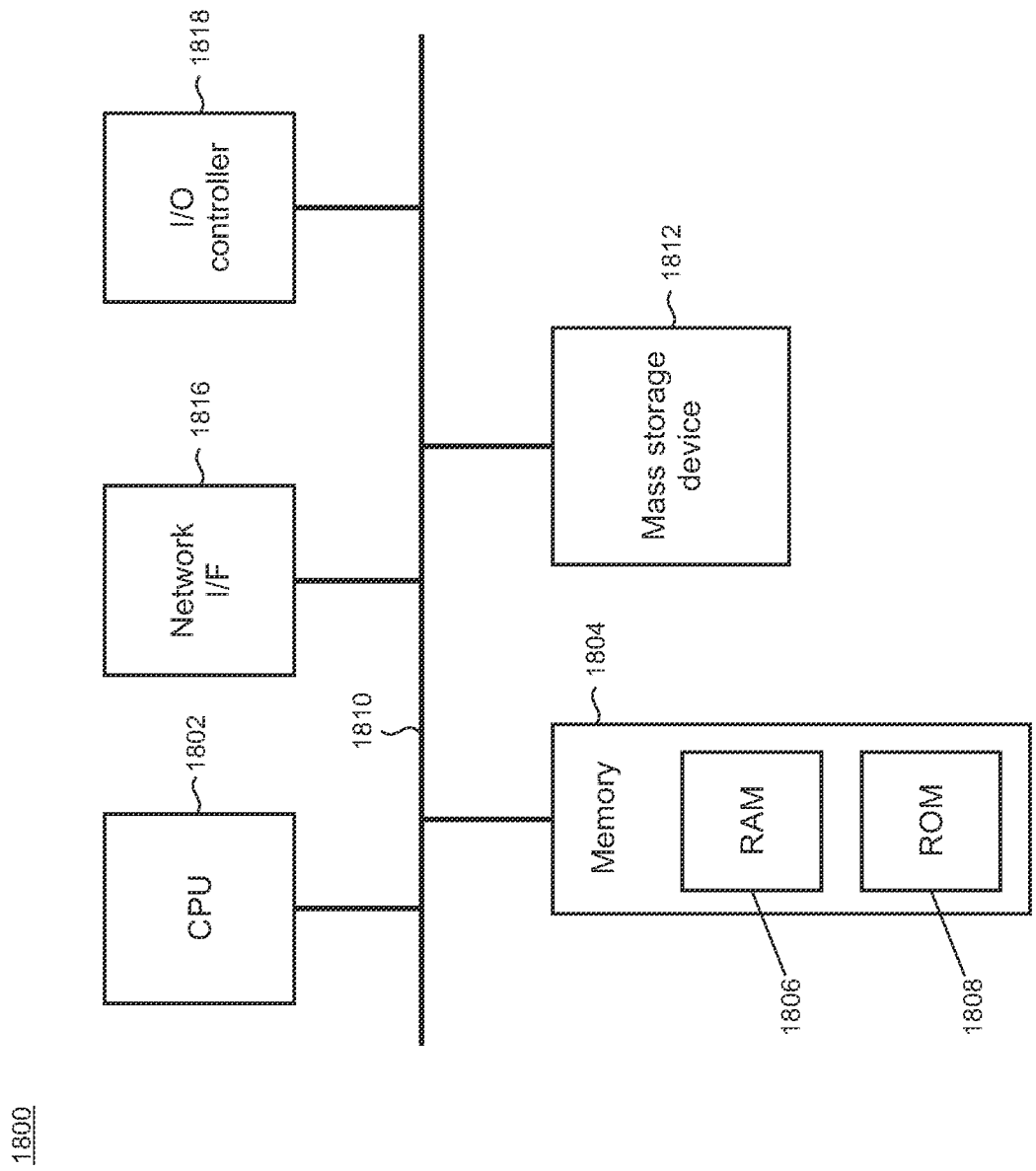
FIG. 18 is a block diagram of an illustrative server or computing device that may be used at least in part to implement the present liveness guarantees in secure enclaves using health tickets.

FIG. 18 shows an illustrative architecture 1800 for a computing device, such as a server, capable of executing the various components described herein for the present liveness guarantees in secure enclaves using health tickets. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
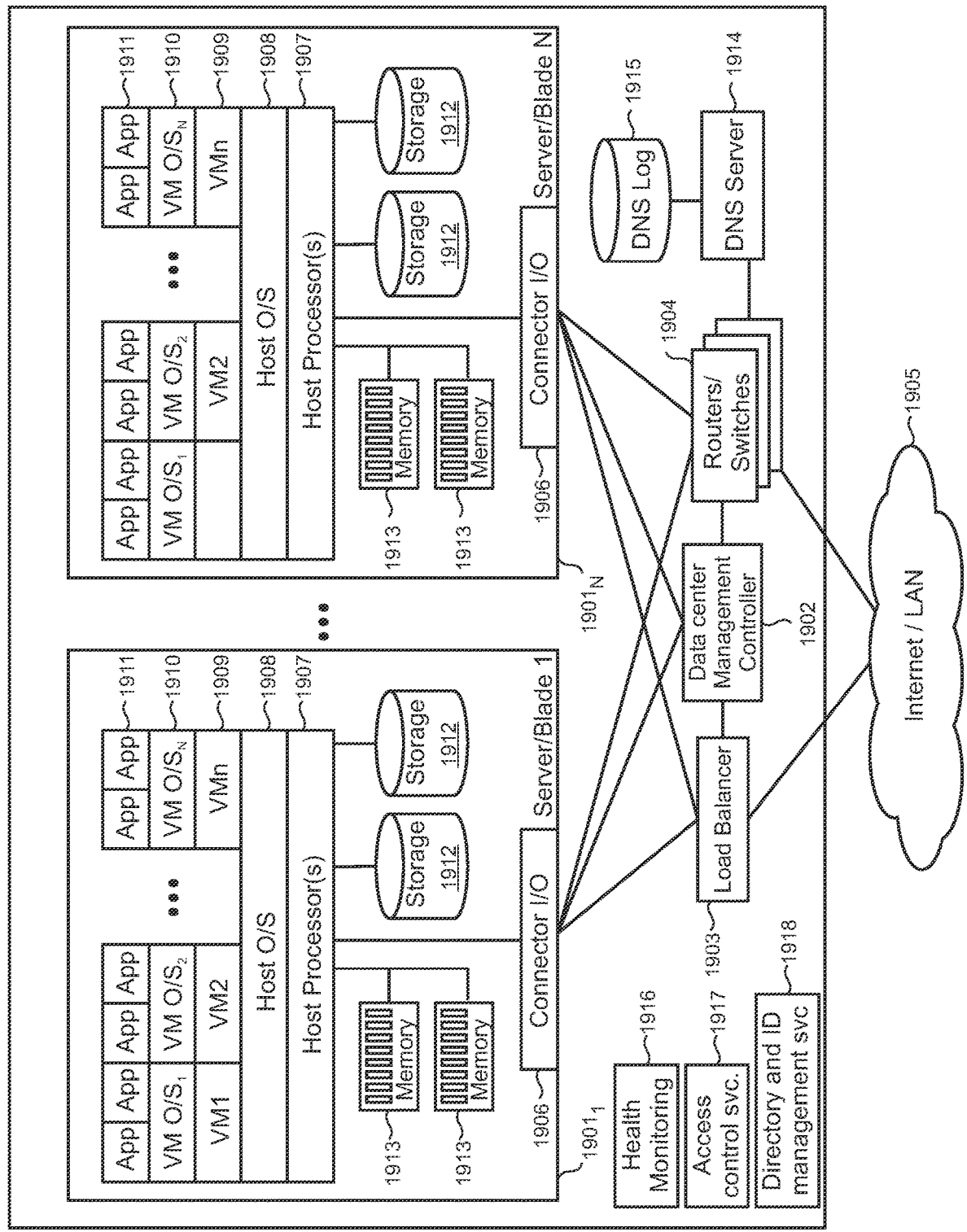
FIG. 19 is a block diagram of an illustrative data center that may be used at least in part to implement the present liveness guarantees in secure enclaves using health tickets.

FIG. 19 is a high-level block diagram of an illustrative data center 1900 that provides cloud computing services or distributed computing services that may be used to implement the present liveness guarantees in secure enclaves using health tickets. Data center 1900 may incorporate one or more of the features disclosed in the DCs shown in the drawings and described in the accompanying text. A plurality of servers 1901 are managed by data center management controller 1902. Load balancer 1903 distributes requests and computing workloads over servers 1901 to avoid a situation wherein a single server may become overwhelmed. Load balancer 1903 maximizes available capacity and performance of the resources in data center 1900. Routers/switches 1904 support data traffic between servers 1901 and between data center 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/Ss 1910 may be, for example, different versions of the same O/S (e.g., different VMs running different current and legacy versions of the Windows® operating system). In addition, or alternatively, the VM O/Ss 1910 may be provided by different manufacturers (e.g., some VMs running the Windows® operating system, while other VMs are running the Linux® operating system). Each VM 1909 may also run one or more applications (App) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Data center 1900 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing data center 1900 allows tenants to scale up or scale down resources dynamically to meet the current needs of their business. Additionally, a data center operator can provide usage-based services to tenants so that they pay for only the resources they use, when they need to use them. For example, a tenant may initially use one VM 1909 on server $1901_1$ to run their applications 1911. When demand for an application 1911 increases, the data center 1900 may activate additional VMs 1909 on the same server $1901_1$ and/or on a new server 1901N as needed. These additional VMs 1909 can be deactivated if demand for the application later drops.

Data center 1900 may offer guaranteed availability, disaster recovery, and back-up services. For example, the data center may designate one VM 1909 on server $1901_1$ as the primary location for the tenant's application and may activate a second VM 1909 on the same or a different server as a standby or back-up in case the first VM or server $1901_1$ fails. The data center management controller 1902 automatically shifts incoming user requests from the primary VM to the back-up VM without requiring tenant intervention. Although data center 1900 is illustrated as a single location, it will be understood that servers 1901 may be distributed to multiple locations across the globe to provide additional redundancy and disaster recovery capabilities. Additionally, data center 1900 may be an on-premises, private system that provides services to a single enterprise user or may be a publicly accessible, distributed system that provides services to multiple, unrelated customers and tenants or may be a combination of both.

Domain Name System (DNS) server 1914 resolves domain and host names into IP addresses for all roles, applications, and services in data center 1900. DNS log 1915 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Data center health monitoring 1916 monitors the health of the physical systems, software, and environment in data center 1900. Health monitoring 1916 provides feedback to data center managers when problems are detected with servers, blades, processors, or applications in data center 1900 or when network bandwidth or communications issues arise.

Access control service 1917 determines whether users are allowed to access particular connections and services provided at the data center 1900. Directory and identity management service 1918 authenticates user credentials for tenants on data center 1900.

Figure 20:
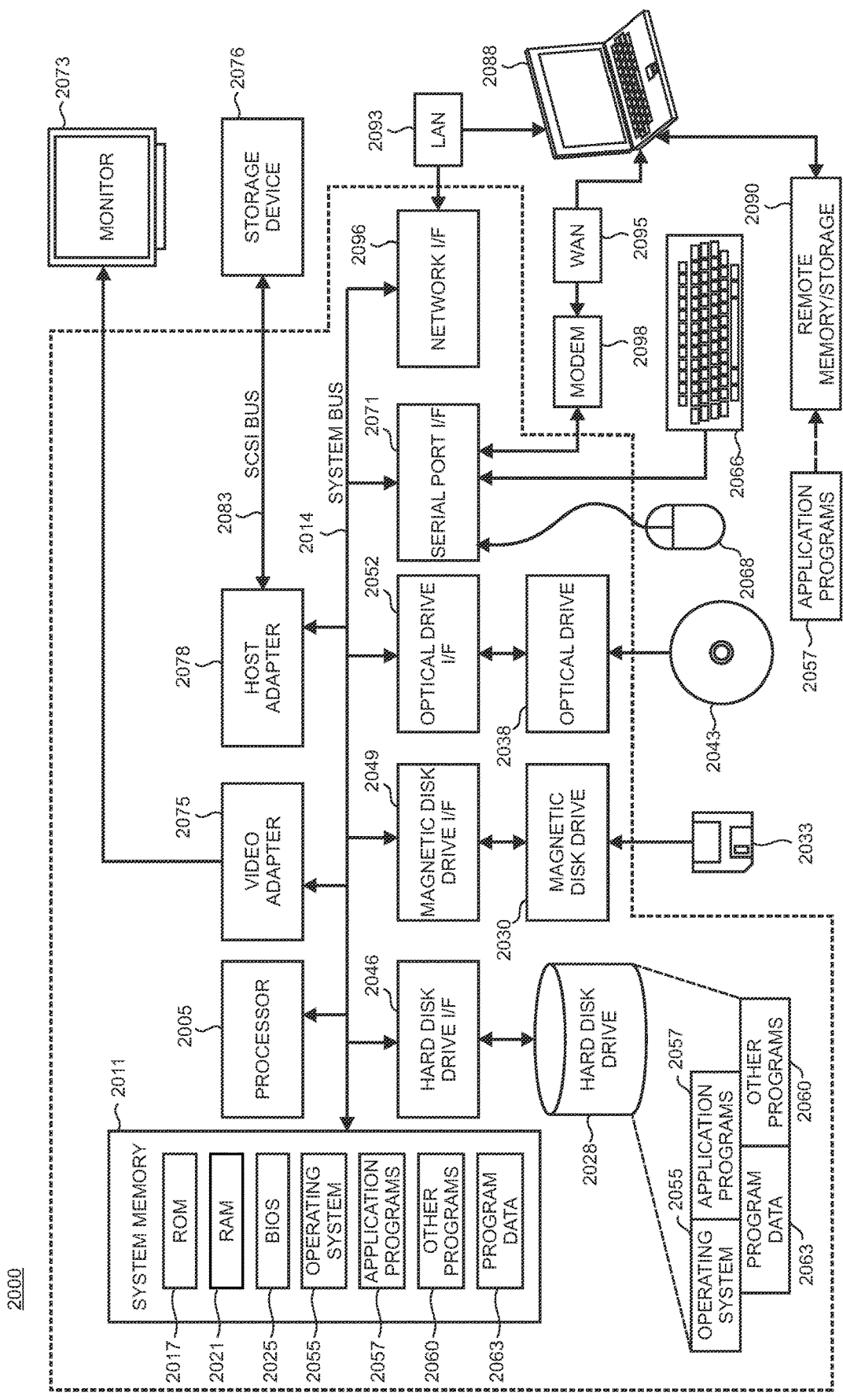
FIG. 20 is a simplified block diagram of an illustrative computer system that may be used at least in part to implement the present liveness guarantees in secure enclaves using health tickets.

FIG. 20 is a simplified block diagram of an illustrative computer system 2000 such as a PC, client machine, or server with which the present liveness guarantees in secure enclaves using health tickets may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present liveness guarantees in secure enclaves using health tickets. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present liveness guarantees in secure enclaves using health tickets.

Various exemplary embodiments of the present liveness guarantees in secure enclaves using health tickets are now presented by way of illustration and not as an exhaustive list of all embodiments. An example includes a computer-implemented method executed on a computing device, comprising: providing an authenticated watchdog timer that executes as a trusted process on the computing device in which the authenticated watchdog timer generates an interrupt; providing an interrupt handler that, responsive to the interrupt generated by the authenticated watchdog timer, reboots the computing device and re-images the computing device from a trusted recovery operating system into a known good state; initializing a secure enclave on the computing device that is configured to host a process for minting a health ticket in which presence of the health ticket causes the interrupt handler to defer the rebooting and re-imaging of the computing device; and executing one or more processes associated with an application in parallel with the health ticket minting process in the secure enclave.

In another example, the computer-implemented method further includes instantiating the authenticated watchdog timer and the interrupt handler using code that executes in a System Management Mode (SMM) on a processor of the computing device. In another example, the computer-implemented method further includes configuring the interrupt handler as an SMI (Secure Management Interrupt) handler that is instantiated by a Unified Extensible Firmware Interface (UEFI) and written to protected SMRAM (System Management Random Access Memory) on the computing device. In another example, the computer-implemented method further includes monitoring a state of the computing device and minting the health ticket responsively to the monitored state. In another example, the computer-implemented method further includes configuring the secure enclave to write the health ticket to a secure channel and configuring the secure channel using a cryptographic primitive comprising a symmetric key. In another example, the symmetric key is provisioned using an enclave software versioning protocol that enables two enclaves having a common author to use a common symmetric key to migrate secrets between the two enclaves. In another example, the computer-implemented method further includes providing one or more policies that are applicable to the health ticket minting process in which the health ticket is minted responsively to the one or more policies and in which the one or more policies relate to health of the computing device during runtime. In another example, the computer-implemented method further includes monitoring forward progress of the application processes during runtime of the computing device and minting the health ticket responsively to the monitoring. In another example, the secure enclave is an SGX (Software Guard Extension) enclave.

A further example includes a computing device, comprising: at least one processor that supports a secure execution environment; hardware-protected System Management Random Access Memory (SMRAM) that is configured for use by the at least one processor to store code associated with a System Management Mode (SMM); at least one non-transitory computer-readable storage device storing computer-executable instructions thereon and further storing code for an operating system (OS) thereon; and an isolated read-only partition of the at least one non-transitory computer-readable storage device storing a recovery OS thereon, wherein the instructions, when executed by the least one processor, cause the computing device to execute a trusted Unified Extensible Firmware Interface (UEFI) providing a runtime that executes System Management Mode (SMM) code; execute SMM code to instantiate a System Management Interrupt (SMI) handler that executes on the computing device to cause the computing device to reboot and be re-imaged from a trusted recovery operating system (OS); initialize a UEFI enclave in the UEFI runtime as a pre-boot process on the computing device; configure an untrusted OS to initialize a post-boot enclave as a post-boot process on the computing device, in which the post-boot enclave supports a health ticket minting process and one or more processes associated with an application, in which the UEFI enclave and the health ticket minting enclave share a common enclave author; monitor forward progress of the application processes executing in the post-boot enclave, and configure the health ticket minting process to mint a health ticket responsively to the monitoring, wherein presence of the health ticket causes the SMI handler to defer the reboot and re-imaging of the computing device.

In another example, the health ticket is configured to be single-use and further configured with security properties to be uniquely bound to the computing device. In another example, the executed instructions further cause the computing device to utilize an enclave versioning support protocol by which enclaves having a common author are each enabled to provision a common symmetric key to provide cryptographic security for the health ticket, in which the enclave versioning support protocol relies on a one-level certificate authority identity methodology and the common enclave author is established by a Certificate Authority (CA). In another example, the computer-executable instructions, when executed, further cause the computing device to execute SMM code to implement an authenticated watchdog timer (AWDT) configured to fire a System Management Interrupt (SMI) when the AWDT expires. In another example, responsively to the SMI, the SMI handler checks for the presence of the health ticket to determine whether to defer rebooting and re-imaging of the computing device.

A further example includes one or more non-transitory computer-readable memory devices storing computer-executable instructions which, upon execution by one or more processors disposed in a computing device, cause the computing device to: provide for System Management Mode (SMM) in the one or more processors to execute a System Management Interrupt (SMI) handler, the SMI handler having default behavior that re-images the computing device to a known good state; provide a secure channel between the SMI handler and a ticket minting process that is hosted in a secure enclave on the computing device, in which the secure channel is cryptographically protected using a symmetric key that is commonly shared by the SMI handler and the health minting process in the enclave; configure the ticket minting process for writing a health ticket to the secure channel in response to a determination by the ticket minting process that application processes executing in the enclave are making forward progress that meets a predetermined threshold; and operate the SMI handler to defer the rebooting and re-imaging of the computing device responsively to a health ticket being present in the secure channel.

In another example, the predetermined threshold is specified by a policy that is accessible by the ticket minting process. In another example, the SMM is executed in a runtime of a trusted Unified Extensible Firmware Interface (UEFI), wherein a UEFI enclave is initiated in the UEFI runtime. In another example, the computer-executable instructions, when executed, further cause the computing device to utilize an SGX (Software Guard Extension) versioning protocol that enables provisioning of the common symmetric key to each of the UEFI enclave and the secure enclave hosting the ticket minting process, wherein the UEFI enclave and the secure enclave hosting the ticket minting process are enabled to provision the common symmetric key under the SGX versioning protocol by virtue of sharing a common author. In another example, the UEFI stores its instance of the common symmetric key in hardware-enforced isolated System Management Random Access Memory (SMRAM). In another example, the secure enclave stores its instance of the common symmetric key in hardware-enforced isolated Processor Reserved Memory (PRM).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method executed on a computing device, comprising:
providing an authenticated watchdog timer that executes as a trusted process on the computing device in which the authenticated watchdog timer generates an interrupt;

providing an SMI (secure management interrupt) handler executing in a runtime of a Unified Extensible Firmware Interface (UEFI) enclave that, responsive to the interrupt being generated by the authenticated watchdog timer, reboots the computing device and re-images the computing device from a trusted recovery operating system into a known good state;

initializing a secure health ticket minting enclave on the computing device that is configured to host a process for minting a cryptographically-protected health ticket, in which presence of the health ticket causes the SMI handler to defer the rebooting and re-imaging of the computing device, wherein the UEFI enclave and the secure health ticket minting enclave share a common enclave author to enable provisioning, using a software versioning protocol, of a common symmetric key providing cryptographic protection for the health ticket; and executing one or more processes associated with an application in parallel with the health ticket minting process in the secure health ticket minting enclave, wherein the health ticket is minted responsively to the executing application processes.

2. The computer-implemented method of claim 1 further including instantiating the authenticated watchdog timer and the interrupt handler using code that executes in a System Management Mode (SMM) on a processor of the computing device.

3. The computer-implemented method of claim 2 further including writing the UEFI enclave to protected SMRAM (System Management Random Access Memory) on the computing device.

4. The computer-implemented method of claim 1 further including monitoring a state of the computing device and minting the health ticket responsively to the monitored state.

5. The computer-implemented method of claim 1 further including configuring the secure health ticket minting enclave to write the health ticket to a secure channel and configuring the secure channel using a cryptographic primitive comprising a symmetric key.

6. The computer-implemented method of claim 5 in which the symmetric key is provisioned using an enclave software versioning protocol that enables two enclaves having a common author to use the common symmetric key to migrate secrets between the two enclaves.

7. The computer-implemented method of claim 1 further including providing one or more policies that are applicable to the health ticket minting process in which the health ticket is minted responsively to the one or more policies and in which the one or more policies relate to health of the computing device during runtime.

8. The computer-implemented method of claim 1 further including monitoring forward progress of the application processes during runtime of the computing device and minting the health ticket responsively to the monitoring.

9. The computer-implemented method of claim 1 in which the secure enclave is an SGX (Software Guard Extension) enclave.

10. A computing device, comprising:
at least one processor that supports a secure execution environment;
hardware-protected System Management Random Access Memory (SMRAM) that is configured for use by the at least one processor to store code associated with a System Management Mode (SMM);
at least one non-transitory computer-readable storage device storing computer-executable instructions thereon and further storing code for an operating system (OS) thereon; and
an isolated read-only partition of the at least one non-transitory computer-readable storage device storing a recovery OS thereon,
wherein the instructions, when executed by the least one processor, cause the computing device to
execute a trusted Unified Extensible Firmware Interface (UEFI) providing a runtime that executes System Management Mode (SMM) code;
execute SMM code to instantiate a System Management Interrupt (SMI) handler that executes on the computing device to cause the computing device to reboot and be re-imaged from a trusted recovery operating system (OS);
initialize a UEFI enclave in the UEFI runtime as a pre-boot process on the computing device;
configure an untrusted OS to initialize a post-boot enclave as a post-boot process on the computing device, in which the post-boot enclave supports a health ticket minting process and one or more processes associated with an application, in which the UEFI enclave and the health ticket minting enclave share a common enclave author;
monitor forward progress of the application processes executing in the post-boot enclave, and
configure the health ticket minting process to mint a health ticket responsively to the monitoring, wherein presence of the health ticket causes the SMI handler to defer the reboot and re-imaging of the computing device.

11. The computing device of claim 10 in which the health ticket is configured to be single-use and further configured with security properties to be uniquely bound to the computing device.

12. The computing device of claim 10 in which the executed instructions further cause the computing device to utilize an enclave versioning support protocol by which enclaves having a common author are each enabled to provision a common symmetric key to provide cryptographic security for the health ticket, in which the enclave versioning support protocol relies on a one-level certificate authority identity methodology and the common enclave author is established by a Certificate Authority (CA).

13. The computing device of claim 10 in which the computer-executable instructions, when executed, further cause the computing device to execute SMM code to implement an authenticated watchdog timer (AWDT) configured to fire a System Management Interrupt (SMI) when the AWDT expires.

14. The computing device of claim 13 in which, responsively to the SMI, the SMI handler checks for the presence of the health ticket to determine whether to defer rebooting and re-imaging of the computing device.

15. One or more non-transitory computer-readable memory devices storing computer-executable instructions which, upon execution by one or more processors disposed in a computing device, cause the computing device to:
provide for System Management Mode (SMM) in the one or more processors to execute a System Management Interrupt (SMI) handler, the SMI handler having default behavior that re-images the computing device to a known good state;
provide a secure channel between the SMI handler and a ticket minting process that is hosted in a secure enclave on the computing device, in which the secure channel is cryptographically protected using a symmetric key that is commonly shared by the SMI handler and the health minting process in the enclave;
configure the ticket minting process for writing a health ticket to the secure channel in response to a determination by the ticket minting process that application processes executing in the enclave are making forward progress that meets a predetermined threshold; and
operate the SMI handler to defer the rebooting and re-imaging of the computing device responsively to a health ticket being present in the secure channel.

16. The one or more non-transitory computer-readable memory devices of claim 15 in which the predetermined threshold is specified by a policy that is accessible by the ticket minting process.

17. The one or more non-transitory computer-readable memory devices of claim 15 in which the SMM is executed in a runtime of a trusted Unified Extensible Firmware Interface (UEFI), wherein a UEFI enclave is initiated in the UEFI runtime.

18. The one or more non-transitory computer-readable memory devices of claim 17 in which the computer-executable instructions, when executed, further cause the computing device to utilize an SGX (Software Guard Extension) versioning protocol that enables provisioning of the common symmetric key to each of the UEFI enclave and the secure enclave hosting the ticket minting process, wherein the UEFI enclave and the secure enclave hosting the ticket minting process are enabled to provision the common symmetric key under the SGX versioning protocol by virtue of sharing a common author.

19. The one or more non-transitory computer-readable memory devices of claim 18 in which the UEFI stores its instance of the common symmetric key in hardware-enforced isolated System Management Random Access Memory (SMRAM).

20. The one or more non-transitory computer-readable memory devices of claim 18 in which the secure enclave stores its instance of the common symmetric key in hardware-enforced isolated Processor Reserved Memory (PRM).

* * * * *